US012504937B2

(12) United States Patent
Akiyama et al.

(10) Patent No.: US 12,504,937 B2
(45) Date of Patent: Dec. 23, 2025

(54) INFORMATION DISPLAY APPARATUS AND METHOD

(71) Applicant: MAXELL, LTD., Kyoto (JP)

(72) Inventors: Hitoshi Akiyama, Kyoto (JP); Tamotsu Ito, Kyoto (JP)

(73) Assignee: MAXELL, LTD., Kyoto (JP)

( * ) Notice: Subject to any disclaimer, the term of this patent is extended or adjusted under 35 U.S.C. 154(b) by 14 days.

(21) Appl. No.: 18/279,436

(22) PCT Filed: Mar. 31, 2021

(86) PCT No.: PCT/JP2021/013998
§ 371 (c)(1),
(2) Date: Aug. 30, 2023

(87) PCT Pub. No.: WO2022/208797
PCT Pub. Date: Oct. 6, 2022

(65) Prior Publication Data
US 2024/0184499 A1 Jun. 6, 2024

(51) Int. Cl.
*G06F 3/14* (2006.01)
*G06F 3/01* (2006.01)
(Continued)

(52) U.S. Cl.
CPC ............ *G06F 3/1431* (2013.01); *G06F 3/013* (2013.01); *G06F 3/0412* (2013.01); *G06T 11/60* (2013.01); *G06F 2203/04104* (2013.01)

(58) Field of Classification Search
CPC ......... G06F 2203/04104; G06F 3/1431; G06F 3/0481; G06F 3/0412; G06F 3/013; G06T 11/60
See application file for complete search history.

(56) References Cited

U.S. PATENT DOCUMENTS

2014/0009394 A1* 1/2014 Lee .................. H04N 21/41407
345/157
2014/0132536 A1 5/2014 Ikenaga et al.
(Continued)

FOREIGN PATENT DOCUMENTS

JP 11-288259 A 10/1999
JP 2000-071809 A 3/2000
(Continued)

OTHER PUBLICATIONS

International Search Report of PCT/JP2021/013998 dated Jul. 6, 2021.

*Primary Examiner* — Muhammad N Edun
(74) *Attorney, Agent, or Firm* — Mattingly & Malur, PC

(57) ABSTRACT

A smartphone which is an information display apparatus includes: a touch panel having a touch sensor detecting contact of an operating object by a user with respect to a display screen; and a proximity sensor detecting proximity of the operating object with respect to the display screen. The operating object is, for example, a hand/finger of the user. The smartphone creates, based on detection by the touch sensor and the proximity sensor, second display information having a content including an operating-object image representing the operating object superimposed on first display information displayed on the display screen of the touch panel, externally outputs the second display information to the external display apparatus, and displays the second display information on a display screen of the external display apparatus.

15 Claims, 18 Drawing Sheets

(51) Int. Cl.
    *G06F 3/041*     (2006.01)
    *G06T 11/60*     (2006.01)

(56) References Cited

U.S. PATENT DOCUMENTS

| | | |
|---|---|---|
| 2016/0280234 A1 | 9/2016 | Reihac |
| 2016/0320900 A1 | 11/2016 | Nabe |
| 2017/0003769 A1 | 1/2017 | Shimazaki et al. |
| 2017/0235435 A1* | 8/2017 | Sohn .................. G06F 3/0481 715/738 |
| 2018/0341400 A1* | 11/2018 | Kim .................. G06F 3/04883 |
| 2019/0079717 A1* | 3/2019 | Lee .................. B60K 35/10 |
| 2024/0004603 A1* | 1/2024 | Qian ............... H04N 21/43637 |

FOREIGN PATENT DOCUMENTS

| | | |
|---|---|---|
| JP | 2006-004093 A | 1/2006 |
| JP | 2015-128918 A | 7/2015 |
| JP | 2016-167298 A | 9/2016 |
| JP | 2016-533302 A | 10/2016 |
| JP | 2017-16004 A | 1/2017 |

\* cited by examiner

FIG. 7
(A)
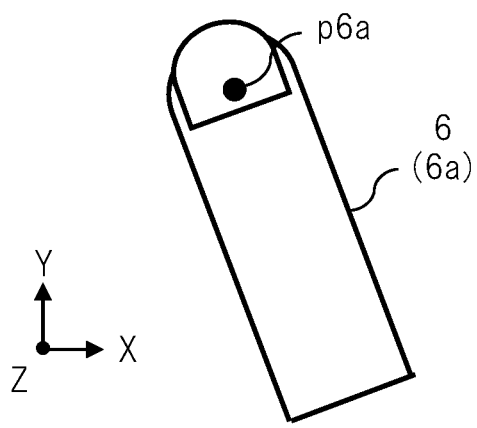
(B)
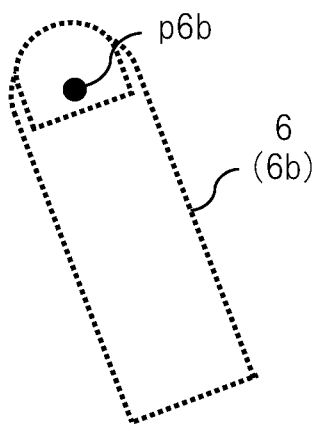
(C)
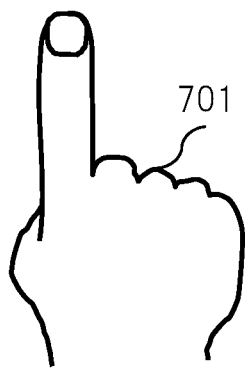
(D)
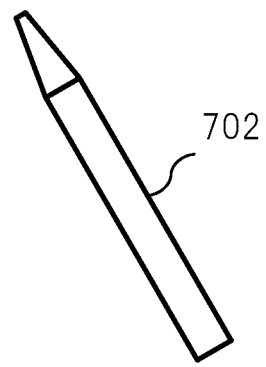

FIG. 10
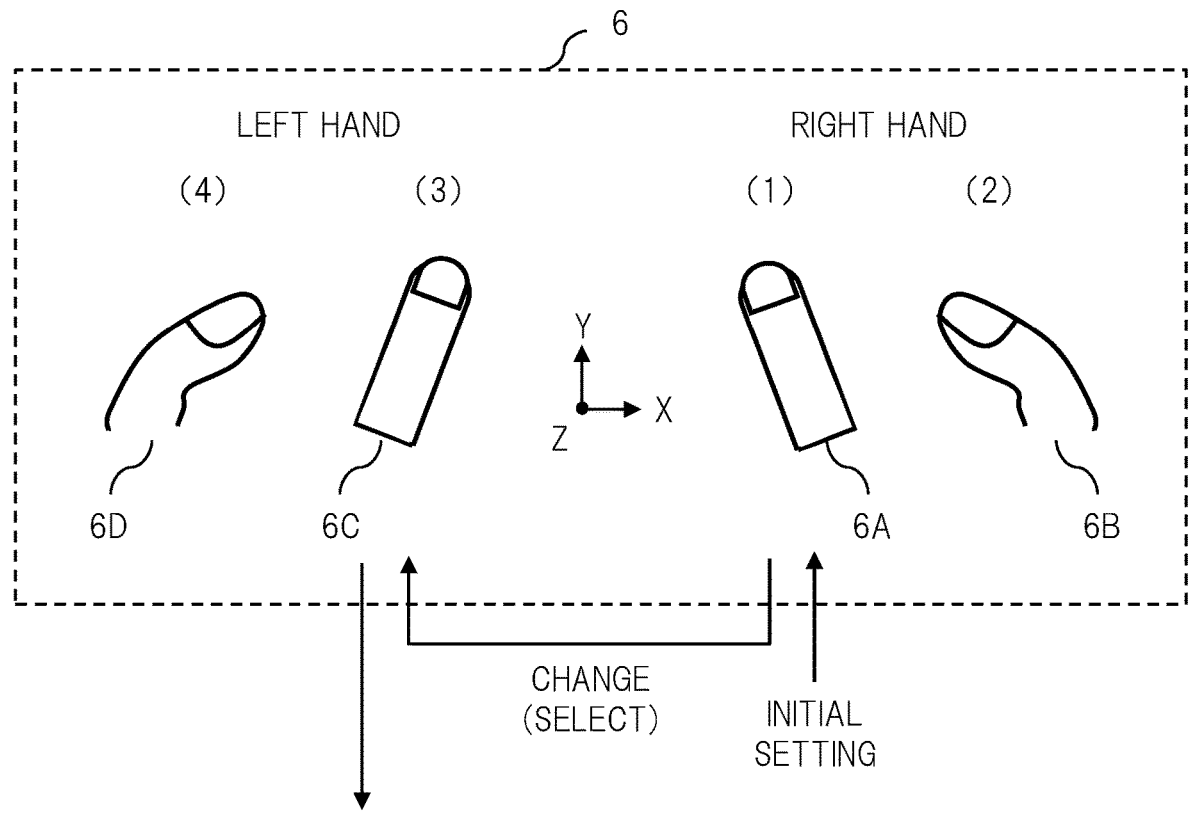
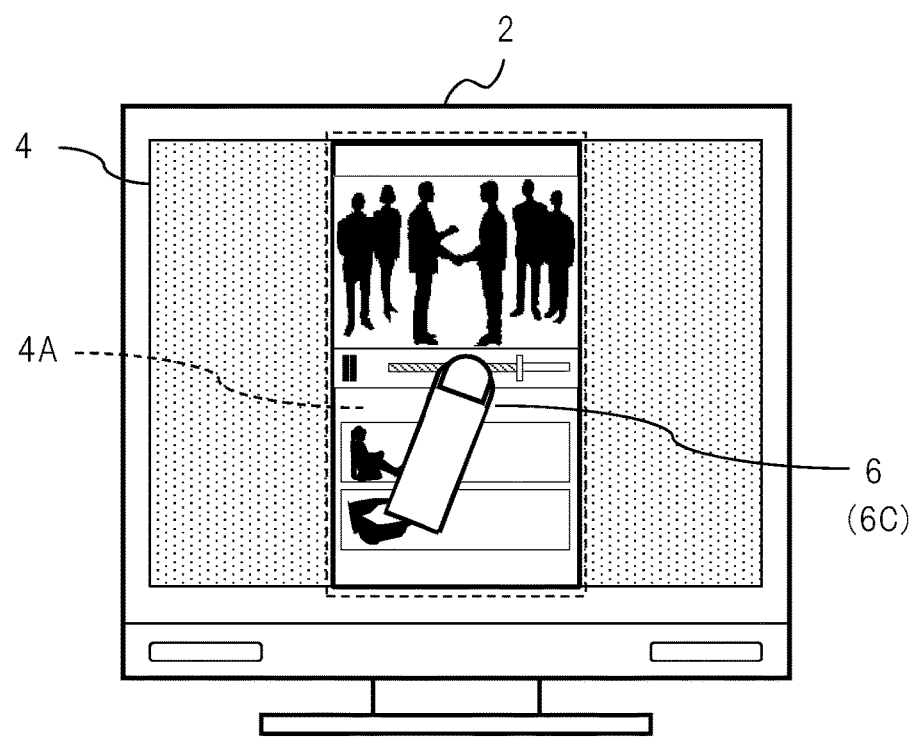

FIG. 17
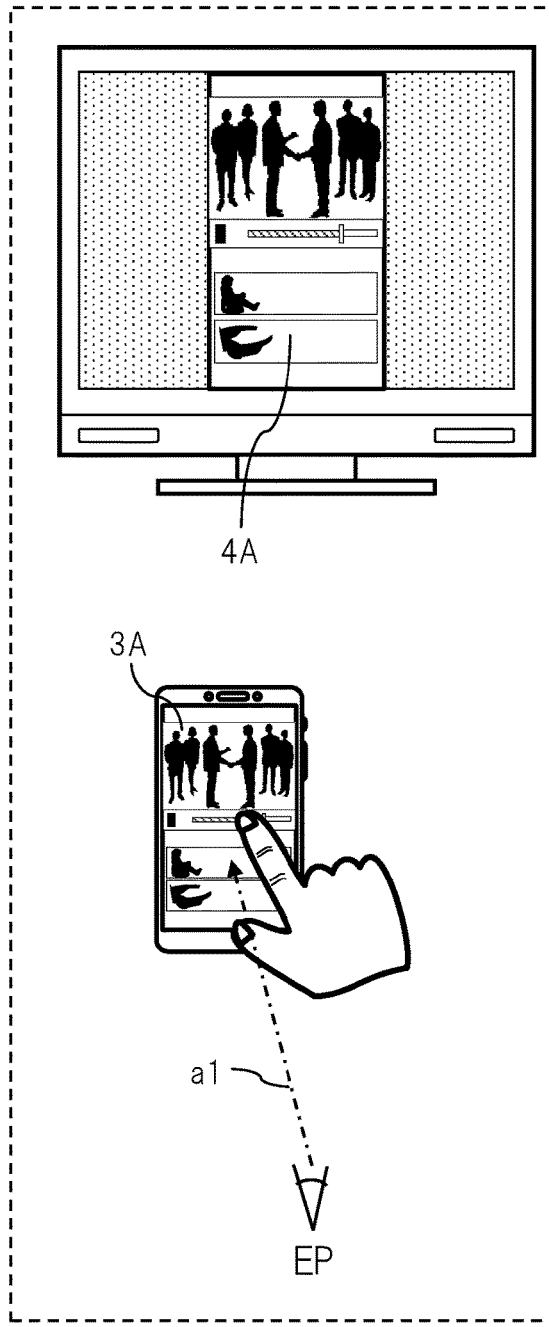
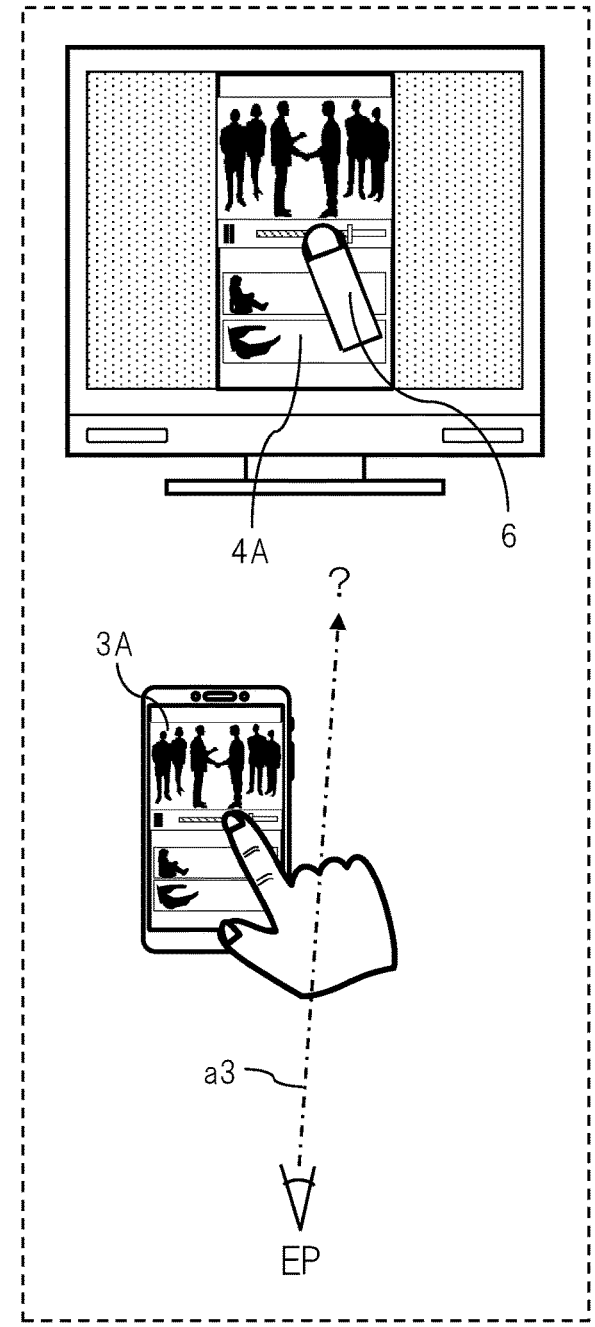

FIG. 18
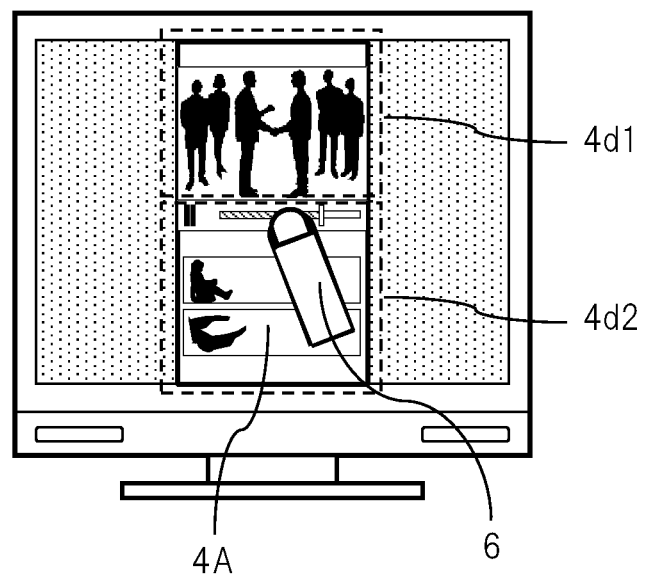
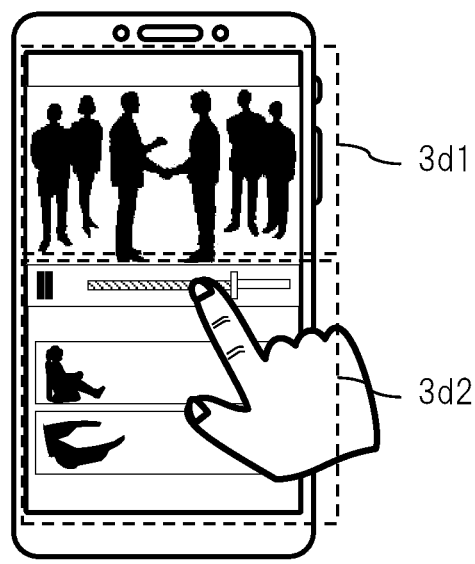

INFORMATION DISPLAY APPARATUS AND METHOD

TECHNICAL FIELD

The present invention relates to a technique of an information display apparatus including a mobile information terminal such as a smartphone.

BACKGROUND ART

In recent years, mobile information terminals typified by smartphones have become common and been widely used. A mobile information terminal such as a smartphone is provided with a touch panel united to a display screen. With such a mobile information terminal, a user can carry out operation of touching the display screen of the touch panel with his/her hand/finger, and can give various instructions to the mobile information terminal through, for example, a touching position of a finger, finger movement, etc.

By an existing technique as a technique related to image display, the same screen as the screen which is displayed by the mobile information terminal can be displayed as it is on an external display apparatus such as a television (television receiver). Such a function is sometimes referred to, for example, mirroring about screens. When such a function is used, the user can view an enlarged screen (sometimes described as a mirroring screen) having the same contents as those of the screen of the mobile information terminal on the display screen (in other words, a large screen) of the external display apparatus larger than the display screen of the mobile information terminal. There are high demands for viewing of such a mirroring screen with a large screen.

As a related art, Japanese Patent Application Laid-open Publication No. 2017-16004 (Patent Document 1) is exemplified. The Patent Document 1 describes that an image display apparatus or the like which enables a presenter to operate, by using a mobile terminal, a superimposed image on an image displayed on a screen by the image display apparatus is provided as the image display apparatus or the like. The Patent Document 1 describes that the image display apparatus transmits, to the mobile terminal, a browser screen which is for controlling the superimposed image (for example, a pointer icon) on the image of the screen, receives display position information of the superimposed image obtained by screen operation of the browser screen displayed on the mobile terminal, and superimposes and displays the superimposed image on the image based on the information.

RELATED ART DOCUMENT

Patent Document

Patent Document 1: Japanese Patent Application Laid-open Publication No. 2017-16004

SUMMARY OF THE INVENTION

Problems to be Solved by the Invention

In related arts, in the above-described mobile information terminal, various instructions are given to the mobile information terminal by a user carrying out an operation of touching the display screen of the touch panel with his/her hand/finger. Therefore, in a case of use of the above-described mirroring technique of the screen, when the user visually recognizes the mirroring screen having the same contents as those of the screen of the mobile information terminal through the large screen of the external display apparatus such as television, there are problems about operability, etc., as described below.

The user operates the touch panel of the mobile information terminal with his/her hand/finger while basically visually recognizing the mirroring screen of the external display apparatus. In this case, only by using the mirroring screen displayed on external apparatus, display the user occasionally cannot much recognize the state of the hand/finger, such as what kind of operation with the hand/finger is suitable. Therefore, every time the user tries to give various instructions to the mobile information terminal, the user needs to move his/her visual line from the mirroring screen to the screen of the touch panel, and carry out the operation of touching the screen with his/her finger. In other words, the user needs to visually recognize the screen and carry out the operation with the hand/finger while moving the visual line between the mirroring screen of the external display apparatus and the screen of the mobile information terminal. Such visual line movement, etc., are cumbersome, and there is a room for improvement regarding operability and usability for the user.

Note that a purpose of the related art example such as the Patent Document 1 is to cause a mobile information terminal to function as a remote controller of an external display apparatus (for example, television), and the related art example is a technique of causing the external display apparatus to control the display of the superimposed image (pointer icon). In this technique, a remote control screen of the external display apparatus is displayed as the browser screen on the touch panel of the mobile information terminal, and the user operates the browser screen serving as the remote control screen by using the touch panel. As a result, the pointer icon is superimposed and displayed as the superimposed image on the display screen of the external display apparatus, and movement control using the pointer icon can be carried out. However, in the technique as described in the Patent Document 1, every time it is necessary to move and control the position of the pointer icon on the screen of the external display apparatus, the user needs to move his/her visual line to the remote control screen displayed on the mobile information terminal.

Regarding the above-described technique of the information display apparatus including the mobile information terminal, an object of the present invention is to, when the screen having the same contents as those of the screen of the mobile information terminal is to be displayed on the external display apparatus (in other words, when mirroring about the screens is to be carried out), provide a technique capable of eliminating or reducing the cumbersomeness of the user such as visual line movement and enhancing the operability and the usability for the user.

Means for Solving the Problems

A typical embodiment of the present invention has the following configuration. An information display apparatus of an embodiment is provided with a touch panel having a touch sensor that detects contact of an operating object made by a user with respect to a first display screen, creates second display information having a content including an operating-object image representing the operating object superimposed on first display information displayed on the first display screen of the touch panel, based on the detection using the touch sensor, externally outputs the second display information to an external display apparatus, and displays the information on a second display screen of the external display apparatus.

Effects of the Invention

According to the typical embodiment of the present invention, regarding the above-described technique of the information display apparatus which is the mobile information terminal, when the screen having the same contents as those of the screen of the mobile information terminal is to be displayed on the external display apparatus (in other words, when mirroring about the screens is to be carried out), the cumbersomeness such as visual line movement of the user can be eliminated or reduced, and the operability and the usability for the user can be enhanced. The problems, configurations, effects, etc., other than those described above will be described in a chapter [DETAILED DESCRIPTION OF PREFERRED EMBODIMENTS].

BRIEF DESCRIPTION OF THE DRAWINGS

FIG. 7 illustrates configuration examples of finger images (operating-object images) of the first embodiment.

FIG. 10 illustrates display examples of a plurality of finger images and a superimposed screen of the external display apparatus in a third embodiment.

FIG. 17 illustrates display control examples corresponding to visual line directions in the sixth embodiment.

FIG. 18 illustrates a setting example of a region in a modification example of the embodiment.

DETAILED DESCRIPTION OF PREFERRED EMBODIMENTS

Figure 1:
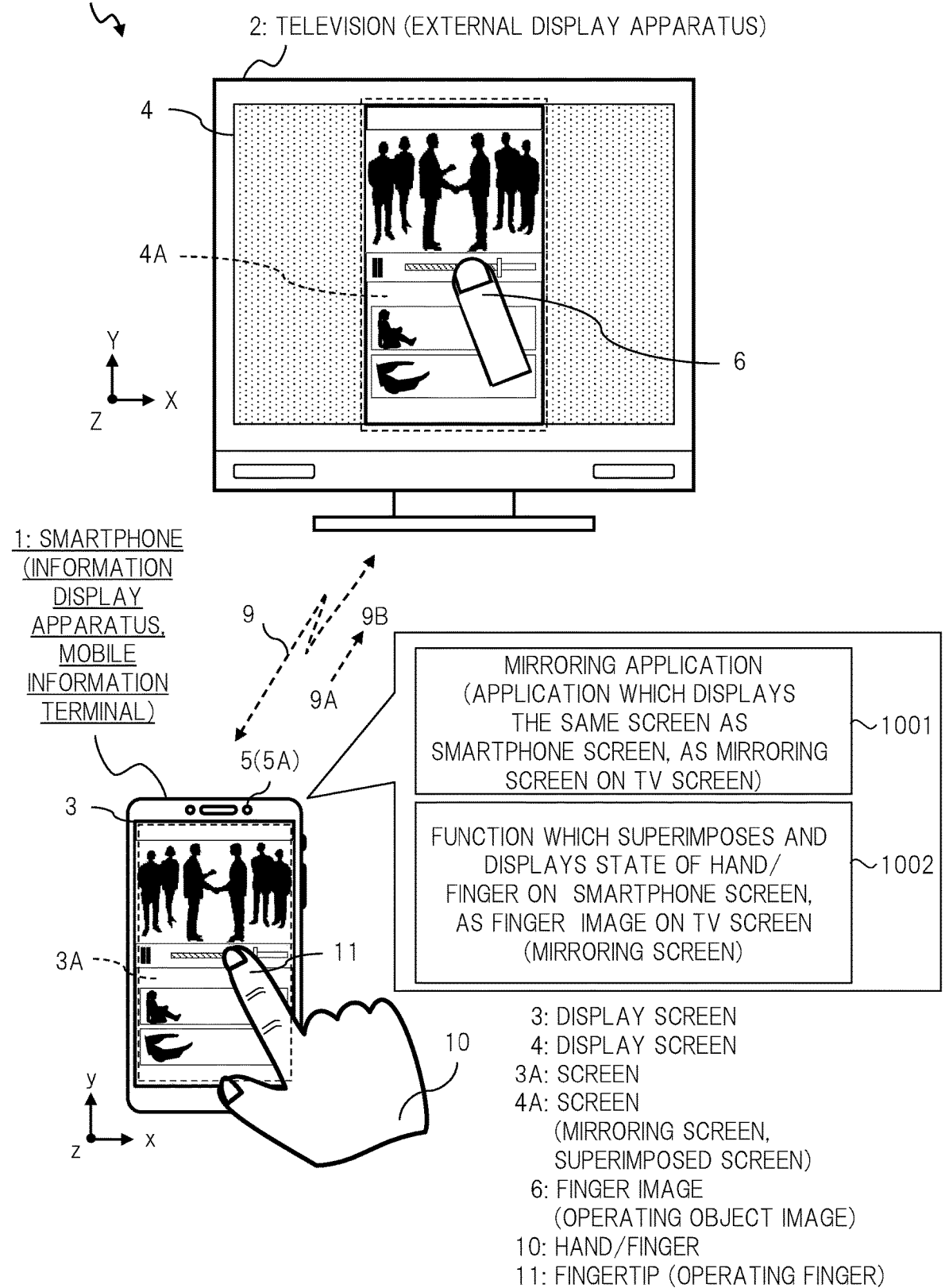
FIG. 1 illustrates a configuration example of a display system including an information display apparatus of a first embodiment of the present invention.

Hereinafter, embodiments of the present invention will be described in detail with reference to drawings. In the drawings, the same parts are basically denoted by the same reference signs, and repetitive explanations will be omitted. In the drawings, expressions of constituent elements may not represent the actual positions, sizes, shapes, ranges, etc., in order to facilitate understanding of the invention, and the present invention is not always limited to the positions, sizes, shapes, ranges, etc., disclosed in the drawings. Structures of tables, lists, etc., can be applied to various data and information, but the data and information is not limited thereto. Expressions such as identification information, identifiers, IDs, names, numbers, etc., about various elements are mutually replaceable.

For the sake of explanation, programs, functions, processing portions, etc., are sometimes explained as subjects in explanation for processing using programs. However, subjects functioning as hardware for these components are processors or controllers, devices, calculators, systems, etc., made of the processors or the like. The calculator executes processing in accordance with programs loaded into a memory while using the processor to appropriately use resources such as the memory, a communication interface, etc. As a result, predetermined functions, processing portions, etc., are achieved. The processor is made of, for example, a semiconductor device such as a CPU and GPU. The processor is made of a device or a circuit which can carry out predetermined computation. The processing is not limited to software program processing, but can also be achieved by a dedicated circuit. FPGA, ASIC, etc., can be applied as the dedicated circuit.

The program may be previously installed as data in a target calculator before product shipment, etc., or may be distributed and installed as data in the target calculator from a program source after the product shipment, etc. The program source may be a program distribution server on a communication network or may be a non-transitory computer-readable storage medium (such as a memory card and an optical disk). The program may include a plurality of program modules. A computer system is not limited to one apparatus, but may be made of a plurality of apparatuses. The computer system may be made of a client server system, a cloud computing system, or the like.

First Embodiment

An information display apparatus of a first embodiment of the present invention will be described with reference to FIG. 1 to FIG. 8. An information display method of the first embodiment is a method including steps executed by the information display apparatus of the first embodiment. When a user carries out operation of bringing his/her hand/finger into proximity or contact with a display screen of a touch panel, a mobile information terminal which is the information display apparatus of the first embodiment creates a superimposed screen having a content including a finger image superimposed on (in other words, synthesized with) an original screen, externally outputs the superimposed screen (corresponding display information) to an external display apparatus, and displays the superimposed screen as a mirroring screen on a display screen of the external display apparatus. The finger image is an example of an operating-object image, and is an image representing the state of operation including the operating position of the hand/finger, etc., above the display screen of the mobile information terminal.

The mobile information terminal which is the information display apparatus of the first embodiment achieves the above-described unique functions only by itself. It is unnecessary to newly mount a special interface for exchange of the necessary data/information (for example, the position information of the hand/finger above the display screen, the finger image, etc.) related to the display of the superimposed screen between the information display apparatus and the external display apparatus.

In the first embodiment, a case of use of a smartphone as the mobile information terminal which is the information display apparatus will be described, and a case of use of a television receiver with a large screen as an example of the external display apparatus will be described.

[Display System]

FIG. 1 illustrates a configuration example of a display system including a smartphone 1 which is the information display apparatus of the first embodiment. FIG. 1 corresponds to a schematic diagram for describing outlines of the first embodiment. This display system has the smartphone 1 which is the information display apparatus of the first embodiment and television 2 which is the external display apparatus, and they are connected by communication 9. The smartphone 1 is a mobile information terminal and is a first display apparatus. The television 2 is the external display apparatus and is a second display apparatus. Both of the smartphone 1 and the television 2 are display apparatuses which can display images and videos on display screens. The information display apparatus of the first embodiment is the smartphone 1 which is the mobile information terminal owned by a user.

FIG. 1 schematically illustrates a hand/finger 10 of the user who operates the smartphone 1 regarding one user who uses the smartphone 1 and the television 2. Specifically, the drawing illustrates a state of a predetermined operation performed by bringing a right index finger serving as a fingertip 11 which is an operating object (in other words, an operation instructing object, operating finger) into proximity and contact with a display screen 3 of the touch panel of the smartphone 1. In the example of the first embodiment, the hand/finger 10 is the right hand, and the fingertip 11 which is the operating object/operating finger is the index finger. The predetermined operation is an operation such as so-called touching, tapping, or swiping.

Specific examples of the operation and state of the smartphone 1 carried out with the hand/finger 10 in FIG. 1 are exemplified below. While holding a body of the smartphone 1 with the unillustrated left hand, the user is operating GUI objects, etc., which are displayed as a screen 3A on the display screen 3 of the touch panel, with the index finger of the right hand exemplified as the fingertip 11 of the illustrated hand/finger 10. As the GUI objects, buttons or slide bars are exemplified.

As a matter of course, the state of the hand/finger 10 is not limited to this. In another example, the user may operate the display screen 3 of the touch panel with the thumb of the left hand while holding the body of the smartphone 1 with the left hand. Alternatively, the user may operate the display screen 3 of the touch panel with one or both hands/fingers while holding the body of the smartphone with both hands. Alternatively, the user may operate the display screen 3 of the touch panel with one or both hands/fingers while placing the body of the smartphone 1 on a table or the like.

The display system of FIG. 1 has the television 2 exemplified as the external display apparatus in comparison to the smartphone 1 which is the information display apparatus of the first embodiment, and they are connected by communication 9 such as wireless communication. The external display apparatus is not limited to the television 2, and any mode is applicable. In the present example, a physical size of a display screen 4 of the television 2 is larger than a physical size of the display screen 3 of the smartphone 1.

The smartphone 1 is provided with the touch panel (described in detail later). The touch panel is configured so that a touch sensor or the like is united to a display (display apparatus), and is a display means as well as an operation input means. The touch panel has the physical display screen 3 as an exposed part of the body of the smartphone 1. The display screen 3 is formed as a rectangular region over almost the entire front surface (facing the user, having the display screen 3) of the body of the smartphone 1.

Also, a camera 5 (for example, a front camera 5A), a microphone, a speaker, a key button (key pad), etc., are also mounted on the body of the smartphone 1. The front camera 5A is a camera which is on the front surface of the body to face the user.

The display screen 3 of the smartphone 1 has a screen 3A serving as the content/state of the images, etc., to be displayed. The display screen 4 of the television 2 has a screen 4A serving as the content/state of the images, etc., to be displayed. For the sake of explanation, note that the physical display screens and the screens serving as the contents/states of the images, etc., displayed on the physical display screens are distinguished from each other.

On the screen 3A (illustrated with a broken-line frame for explanation) of the display screen 3 of the smartphone 1, for example, contents such as a GUI of an application and a video are displayed. In other words, the screen 3A is a smartphone screen, an original screen, or the like. When mirroring is to be carried out, the smartphone 1 transmits display information (in other words, screen display information) 9A, which is corresponding to the screen 3A, to the television 2 via a transmission path of the communication 9. The television 2 receives the display information 9A, which is output from the smartphone 1, as display information 9B (in other words, screen display information as external input) for the television 2 via the communication 9. Then, based on the display information 9B, the television 2 displays the screen 4A (illustrated with a broken-line frame for explanation) on the display screen 4 based on a common television mechanism.

The screen 4A is the screen (in other words, a mirroring screen, a superimposed screen) which has the same contents/state as those of the screen 3A. Depending on the size of the display screen 4, the screen 4A with the size enlarged from the size of the screen 3A is displayed. Therefore, the screen 4B has a larger size than the screen 3A. More specifically, the user can view the contents, which are corresponding to the screen 3A, to be enlarged on the screen 4B. Note that the display information 9A, 9B may be accompanied by control information about mirroring.

Also, in the example of FIG. 1, the user uses the smartphone 1 in a portrait orientation state. When the screen 3A is in the portrait orientation state in this manner, the screen 4B of the television 2 side is accordingly also in the portrait orientation state. The display information 9A and the display information 9B are the data supporting the portrait orientation state. In part of the display screen 4, the screen 4B in the portrait orientation is maximally enlarged and displayed. The other region of the display screen 4 is, for example, a black background. When the user is using the smartphone 1 in a landscape orientation state, the screen 3A and the screen 4A are displayed in the landscape orientation.

By using later-described sensors, the smartphone 1 of the first embodiment detects the state in which the hand/finger 10 (specifically, the fingertip 11) of the user is in proximity or in contact with the display screen 3 (corresponding screen 3A) of the touch panel. For example, as illustrated in FIG. 1, the user touches and operates the GUI objects, etc., in the screen 3A. In that processing, the state in which the fingertip 11 is in proximity or in contact with the screen 3A (GUI objects, etc.) is detected by the sensors. Then, the smartphone 1 creates a finger image (image representing the right index finger, which is the operating finger) corresponding to the position of the fingertip 11, etc., which is in proximity or in contact therewith. The smartphone 1 creates the superimposed screen (corresponding display information 9A) having the contents in which the finger image is superimposed on the screen 3A. Then, the smartphone 1 externally outputs the display information 9A of the superimposed screen to the television 2 via the communication 9.

As a result, in the smartphone 1, the screen 4A which corresponds to the superimposed screen or the mirroring screen can be displayed in the display screen 4 of the television 2. A finger image 6 on the screen 4A is an example of the operating-object image representing the state of the operating finger (specifically, the fingertip 11) on the screen 3A. In the present example, the finger image 6 is an image of only part of one finger, but is not limited thereto, and detailed examples will be described later. The user can recognize the state of the operating finger on the screen 3A by visually recognizing the screen 4A. Such mirroring control of the superimposed screen is continued almost in real time in time series.

As described above, regarding the screen 3A to be visually recognized by the user who is operating the touch panel with the fingertip 11 of the hand/finger 10, the smartphone 1 which is the information display apparatus of the first embodiment displays, as the screen 4A on the display screen 4 of the television 2, the mirroring screen (specifically, the superimposed screen including the finger image 6) having almost the same situation as the situation of the screen 3A including the state of the operation by the hand/finger 10. As a result, the user can visually recognize the screen 4A superimposed with the finger image 6 in the television 2, without the necessity of visually recognizing the display screen 3 of the touch panel and the operating finger such as the right index finger which is operating the smartphone 1. Since the user can understand the state of the hand/finger 10 while the user keeps visually recognizing the screen 4A of the television 2, the user can suitably operate the smartphone 1 with the hand/finger 10. In the manner, the user is not required to move his/her visual line from the display screen 4 of the television 2 to the display screen 3 of the smartphone 1. Therefore, the cumbersomeness of the visual line movement in the related art can be eliminated.

Figure 2:
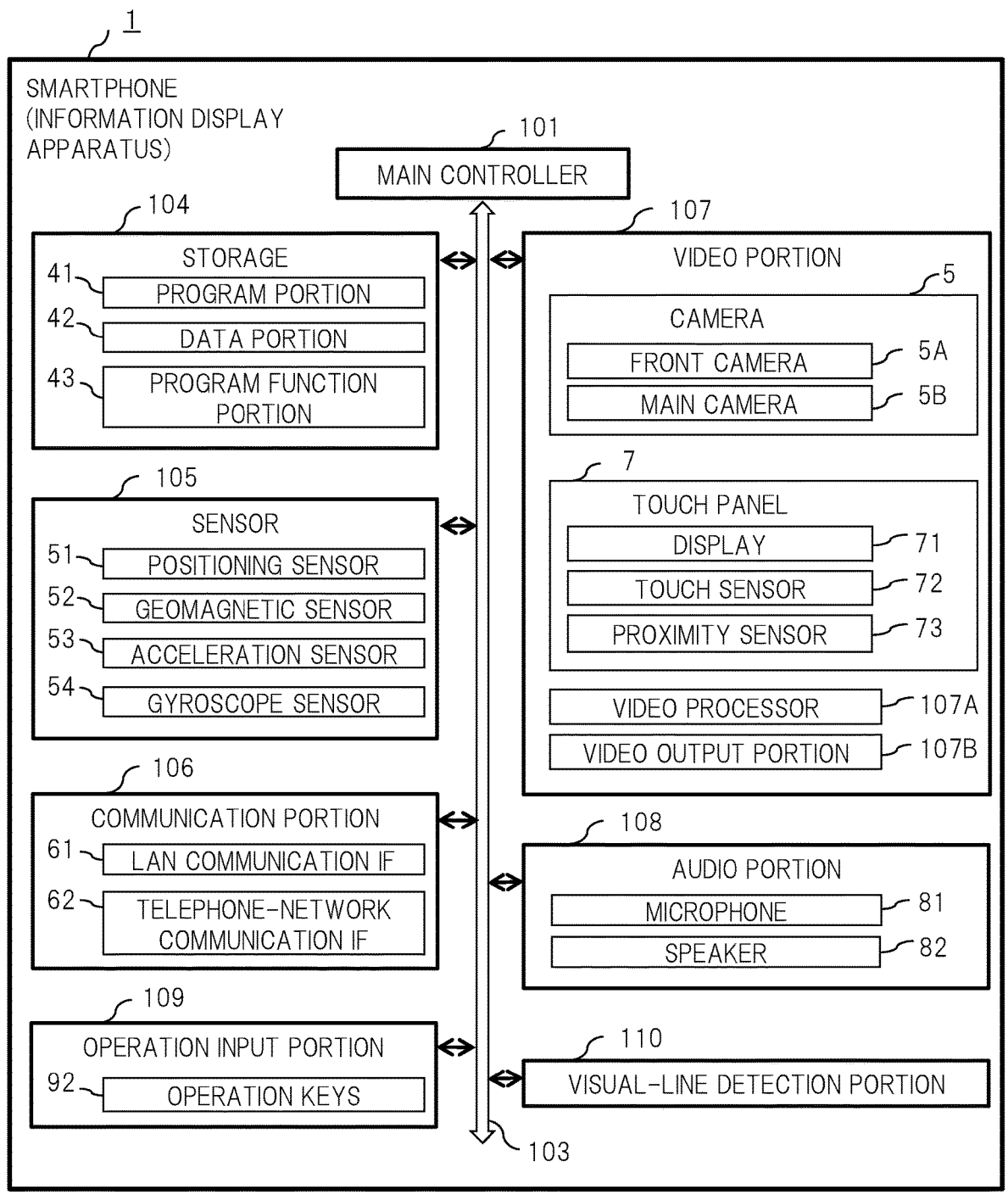
FIG. 2 illustrates a block configuration example of hardware, etc., of a smartphone which is the information display apparatus of the first embodiment.

The transmission path of the communication 9 will be additionally described. The display information 9A which is externally output from the smartphone 1 to the television 2 is the display information of the original screen 3A (in other words, the screen not superimposed with the finger image 6) or the display information of the screen (superimposed screen) in which the finger image 6 is superimposed on the screen 3A. The display information 9A is input as the display information 9B to the television 2 via the transmission path of the communication 9. In the first embodiment, the display information 9A output from a later-described video output portion 107B of FIG. 2 is externally output via a Wi-Fi (registered tradename) network of a LAN communication interface 61 of a communication portion 106. Therefore, the Wi-Fi network of the LAN communication interface 61 of the smartphone 1 and a Wi-Fi network of the television 2 are connected as one Local Area Network (LAN). The connection of the Wi-Fi network connects the smartphone 1 and the television 2 which is the external display apparatus. In the manner, in the first embodiment, the mirroring about the screen 3A, specifically the screen 4A superimposed with the finger image 6 and displayed is achieved by using a mirroring application 1001 of the smartphone 1 and the wireless connection of the transmission path of the communication 9.

Also, wired connection of the transmission path of the communication 9 can be also achieved by outputting the display information 9A from the video output portion 107B of FIG. 2 of the smartphone 1 via, for example, a Universal Serial Bus (USB) cable. As a matter of course, the interface related to external output of data such as a video and audio accompanying the video is not limited to this, but may be an interface of another type.

As illustrated in FIG. 1, in the smartphone 1 of the first embodiment, the mirroring application 1001 is installed as one of application programs. The mirroring application 1001 is an application which causes the external television 2 to display, as the mirroring screen (screen 4A), the screen of the same contents/state as those of the screen 3A of the display screen 3. The mirroring application 1001 includes mounting of a unique function 1002. Alternatively, in the smartphone 1, separately from the mirroring application 1001, the function 1002 may be additionally mounted. The function 1002 is specifically the function which superimposes and displays, as the finger image 6 on the mirroring screen (screen 4A) of the television 2, the state of the operating finger of the user on the screen 3A which is the smartphone screen. Note that an idea such as the mirroring application has conventionally existed. In the first embodiment, the unique function 1002 is achieved on the assumption of such a mirroring application 1001.

The user can use the mirroring function about the screen by operating the mirroring application 1001 on the smartphone 1. Also, the user can use a user setting function as a function which is part of the mirroring application 1001 or the function 1002. The user setting function is the function which can provide a graphical user interface (GUI) for user setting and can carry out setting about the function 1002 (for example, later-described setting of the operating finger and the finger image). Usage of the user setting function is not essential.

The smartphone 1 may transmit/receive various data/information to/from an external server, equipment, or the like other than the television 2. For example, the smartphone 1 may acquire the contents data or the like, which is to be displayed by the mirroring application 1001, from an external server or the like or may store the data, which has been used by the mirroring application 1001, in an external server or the like.

[Information Display Apparatus (Smartphone)]

FIG. 2 illustrates a block configuration example of hardware, etc., in the smartphone 1, which is the information display apparatus of the first embodiment. A main body of the smartphone 1 has the following various blocks. The smartphone 1 is configured to include, for example, a main controller 101, a system bus 103, a storage 104, a sensor 105, the communication portion 106, a video portion 107, an audio portion 108, an operation input portion 109 and others. Necessary power is supplied from an unillustrated battery to each component.

The main controller 101 corresponds to a processor or a controller, is a portion which controls the entirety and each component of the smartphone 1 in accordance with predetermined programs, and includes, for example, a microprocessor unit (MPU) or the like. The system bus 103 is a data communication path for transmitting/receiving various commands, data, etc., between the main controller 101 and each block in the smartphone 1.

The storage 104 is made of a memory device, a storage device, or the like, and stores various data/information. The storage 104 has, for example, a program portion 41, a data portion 42, and a program function portion 43. The program portion 41 stores programs, etc., for controlling operation of the smartphone 1. The data portion 42 stores various data such as operation set values of the smartphone 1, detected values from the sensor 105, objects including contents, information downloaded from libraries, and objects for building a GUI. The program function portion 43 is used as a rewritable part such as a work area used in various program operations. Also, the storage 104 can store operation programs downloaded from a network such as the Internet via communication, various pieces of data created by the operation programs, and data of contents such as moving images, still images, and audio downloaded from the network. Also, the storage 104 can store the data such as moving images and still images captured by using an image capturing function of the camera 5. Also, the storage 104 can store necessary data/information such as threshold values for control, image data during processing, and sensor detection information.

Also, at least part of the storage 104 needs to retain the stored information even when power is not supplied from outside to the smartphone 1. Therefore, the storage 104 uses, for example, a semiconductor element memory such as a flash ROM or a Solid State Drive (SSD) or a non-volatile storage device such as a magnetic disk drive such as a Hard Disc Drive (HDD). Note that the operation programs stored in the storage 104 can be updated and enhanced in terms of function by, for example, downloading processing from each server on the network.

The sensor 105 is a sensor group of various sensors for detecting various states of the smartphone 1. The sensor 105 includes, for example, a positioning sensor 51 using Global Positioning System (GPS) or the like, a geomagnetic sensor 52, an acceleration sensor 53, and a gyroscope sensor 54. This sensor group enables detection of the position, tilt, orientation, movement, etc., of the smartphone 1. Also, the smartphone 1 may further include sensors of other types such as an illuminance sensor and an altitude sensor.

The video portion 107 includes a touch sensor 72 and a proximity sensor 73 in the touch panel 7. In the first embodiment, the touch sensor 72 and the proximity sensor 73 are united to the touch panel 7 and are embedded in the touch panel 7. The proximity sensor 73 is not limited thereto, but may be included in the sensor 105 as an independent sensor separated from the touch panel 7. Also, the touch sensor 72 and the proximity sensor 73 are separated from each other, but may be a united sensor.

The touch sensor 72 is the sensor which detects the state of contact including detection of whether the hand/finger 10 of the user has been in contact with the display screen 3 of the display 71 (that is a device such as a liquid crystal display device which displays images on the display screen 3) of the touch panel 7. Most of existing touch panels (for example, liquid crystal touch panel modules) are of, for example, an electrostatic capacitance type, and can detect the state of proximity and contact with respect to the display screen 3. In the first embodiment, the touch sensor 72 and the proximity sensor 73 of the touch panel 7 are of the electrostatic capacitance type, and detect the state of proximity and contact of the hand/finger 10 with respect to the display screen 3.

The proximity sensor 73 is the sensor which detects the state of proximity including detection of whether the hand/finger 10 of the user has been in proximity with the display screen 3 of the display 71 of the touch panel 7. The technical types of the touch sensor 72 and the proximity sensor 73 are not limited, and various publicly known types can be applied. Detailed examples of the proximity sensor 73 will be described later. In the embodiments, "proximity" and "contact" are distinguished from each other for the sake of explanation although described later.

The touch sensor 72 and the higher-level processing portions thereof (the video portion 107 and the main controller 101) can detect/calculate, as position coordinates, the position ("contact position") at which the hand/finger 10 (specifically, the fingertip 11) has been in contact above the display screen 3. When the coordinate system of the display screen 3 is expressed to be (x,y) as illustrated in FIG. 1, the position coordinates of the contact position can be expressed as, for example, (x1,y1). The direction "x" is an in-screen horizontal direction, and the direction "y" is an in-screen vertical direction.

Also, the proximity 73 and the higher-level processing portions thereof can detect/calculate, as position coordinates, the position ("proximity position") with which the hand/finger 10 (specifically, the fingertip 11) has been in proximity in the space region above the display screen 3 (in the surface vertical direction). When the coordinate system (x,y,z) of three-dimensional space is taken into consideration by using the direction z as the surface vertical direction in addition to the coordinate system (x,y) of the display screen 3, the position coordinates of the proximity position can be expressed as, for example, (x1,y1,z1). Particularly, the proximity sensor 73 can detect/calculate the distance between the fingertip 11 and the display screen 3 in the surface vertical direction (z-direction) (in FIG. 8 described later).

In the main controller 101 of the smartphone 1, the state about proximity and contact of the fingertip 11 above the display screen 3, in other words, the state of operation can be acquired as the detection information including the position coordinates, etc., by, for example, the touch sensor 72 and the proximity sensor 73 of the above-described touch panel 7.

The video portion 107 includes the camera 5, the touch panel 7, a video processor 107A, and the video output portion 107B. The camera 5 includes, for example, the front camera 5A as illustrated in FIG. 1 and a main camera 5B. In the camera 5, image data of surroundings and objects is input by using an electronic device such as a Charge Coupled Device (CCD) or a Complementary Metal Oxide Semiconductor (CMOS) sensor to convert the incident light through a lens into electric signals. In the first embodiment, as a configuration example of the camera 5, as illustrated in FIG. 1, the front camera 5A (in other words, in-camera) is disposed on part of the front surface of the body, and the main camera 5B (in other words, out-camera) is disposed on the unillustrated back side.

The touch panel 7 includes the display 71, the touch sensor 72, and the proximity sensor 73. The display 71 displays images and videos on the display screen 3, based on the signals of the images and videos output from the video processor 107A. The display 71 can display, for example, images and videos obtained via the Internet, images and videos captured by the camera 5, images designated by the user, etc.

By using the touch sensor 72, the touch panel 7 detects the position coordinates of the contact position of the fingertip 11 of the operating finger which has been in contact with the display screen 3 of the display 71. The techniques for detecting the contact position coordinates are typified by a method of detecting operation related to the contact as electrostatic capacitance changes by using the touch sensor 72 of the electrostatic capacitance type. The method is not limited to this, but another method may be employed. Also, in the case of the touch panel 7 including the touch sensor 72 and the proximity sensor 73 of the electrostatic capacitance type, proximity detection and contact detection of the fingertip 11 with respect to the display screen 3 can be concurrently carried out in parallel.

The video processor 107A is made of, for example, a graphic processing unit (GPU), and carries out, for example, processing of displaying images/videos based on the image/video data onto the display screen 3 of the display 71. Note that the images/videos may be still images or moving images. In the first embodiment, the video processor 107A also carries out, for example, video processing of creating the superimposed screen (corresponding display information 9A) having the contents in which the finger image is superimposed on the contents of the screen 3A.

The video output portion 107B carries out, for example, processing of externally outputting, to the television 2 which is the external display apparatus, the display information 9A for building the screen 4A having the same contents/state as those of the screen 3A displayed on the display screen 3 of the display 71. To the television 2 which is the external display apparatus, the video output portion 107B outputs, as the display information 9A, the display information having the contents of the screen 3A or the display information of the superimposed screen having the contents in which the finger image is further superimposed on the contents of the display information.

The first embodiment is configured so that the image portion 107 mainly carries out the processing about the above-described superimposed screen, but is not limited thereto. Another block such as the main controller 101 may be configured to carry out similar processing. Also, such processing may be shared among a plurality of the blocks in FIG. 2.

The communication portion 106 is a device which has a communication interface, and includes, for example, the LAN communication interface 61 and a telephone-network communication interface 62. The LAN communication interface 61 is connected to a communication network such as the Internet via an access point, etc., and transmits/receives data to/from server devices, etc., on the communication network. The connection with the access point, etc., is established by wireless connection using a wireless LAN interface such as Wi-Fi (registered tradename), but may use wired connection. In the first embodiment, the smartphone 1 uses Wi-Fi wireless connection using the communication portion 106 as the communication 9 of FIG. 1, and outputs/transmits the above-described display information 9A to the television 2 which is the external display apparatus.

The telephone-network communication interface 62 carries out telephone communication (calls) and data transmission/reception through the wireless communication with base stations, etc., of a mobile-phone communication network. The communication with the base station, etc., is carried out by, for example, the Long Term Evolution (LTE) system, the 5-th generation mobile communication system (5G system), or another communication system. Each of the LAN communication interface 61 and the telephone-network communication interface 62 is provided with an encoding circuit, a decoding circuit, an antenna, etc. Also, the communication portion 106 may be further provided with another communication interface such as an infrared communication interface.

The audio portion 108 includes the microphone 81 and the speaker 82. The microphone 81 converts the sound, the voice of the user, etc., in real space, to audio data, and receives it as input. The speaker 82 outputs required audio information, etc., as audio to the user. As a matter of course, the audio portion 108 can be connected to earphones or headphones, and can be used differently depending on use.

The operation input portion 109 is a block for the user to input of operation of instructions, etc., to the smartphone 1, and includes, for example, operation keys 92 as input devices other than the touch panel 7. The operation keys 92 are, for example, a power button switch, a sound-volume button switch, etc., disposed on a side surface of the body of the smartphone 1. Note that the smartphone 1 may be further provided with other operation devices. Also, the smartphone 1 may be further connected to a separate input device or output device by wired communication or wireless communication using the interface of the communication portion 106, and may be connected to separate mobile terminal equipment, etc. The user may carry out input/output to/from the smartphone 1 by using such a device.

Also, the smartphone 1 may be additionally provided with unillustrated constituent elements such as an electronic money payment function and a user authentication function. Note that a visual-line detector 110 in FIG. 2 is a block provided in a later-described sixth embodiment.

[Function Blocks (1)]

Figure 3:
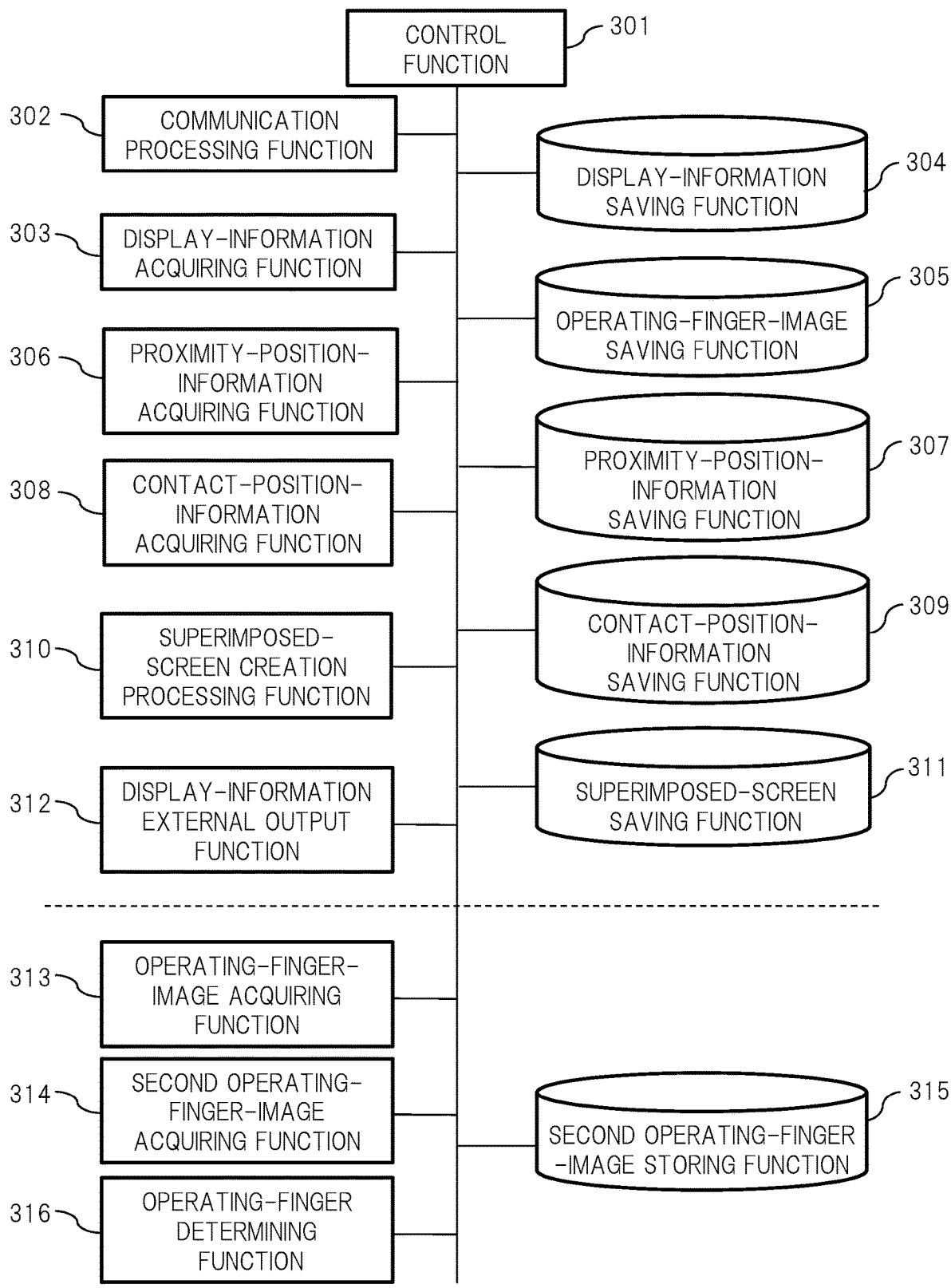
FIG. 3 illustrates a block configuration example of main functions of the information display apparatus of the first embodiment.

FIG. 3 illustrates a block configuration example about main functions (the functions about screen mirroring and the function 1002 about the superimposed screen) of the smartphone 1 in the first embodiment. The function blocks of FIG. 3 are made of, for example, the main controller 101 and the image portion 107 of FIG. 2. The configuration of FIG. 3 has a control function 301, a communication processing function 302, a display-information acquiring function 303, a display-information storing function 304, an operating-finger-image storing function 305, a proximity-position-information acquiring function 306, a proximity-position-information storing function 307, a contact-position-information acquiring function 308, a contact-position-information storing function 309, a superimposed-screen creation processing function 310, a superimposed-screen storing function 311, and a display-information external output function 312.

Note that an operating-finger-image acquiring function 313 in FIG. 3 is a block provided in a later-described third embodiment. A second operating-finger-image acquiring function 314 and a second operating-finger-image storing function 315 are blocks provided in a later-described fourth embodiment. An operating-finger determining function 316 is a block provided in a later-described fifth embodiment. These blocks are not used in the first embodiment.

The control function 301 is the function which controls the entire smartphone 1, and mainly includes the main controller 101 and the program portion 41 and the program function portion 43 of the storage 104 of FIG. 2. The communication processing function 302 is mainly made of the communication portion 106 of FIG. 2, and is the function which carries out the communication 9, etc., in FIG. 1.

The display-information acquiring function 303 is the function which acquires the display information for displaying the screen 3A onto the display screen 3 of the smartphone 1. Examples of the display information include display information such as Web pages and contents acquired by the communication processing function 302 via the Internet, display information created previously by a program or the like, and images captured by the user. The display-information storing function 304 is the function which causes the data portion 42 of the storage 104 to store the display information obtained by the display-information acquiring function 303 therein.

The operating-finger-image storing function 305 is the function which causes the data portion 42 of the storage 104 to store the finger image corresponding to the fingertip 11 which is the operating finger. In the first embodiment, the finger image data of the right index finger is stored as an initial setting value of the finger image of the operating finger. Note that various finger images may be stored in the storage 104, and the finger image of the type corresponding to the operating finger used by the user may be selected for use from the various finger images as described later. In such a case, by the operating-finger-image storing function 305, the various finger images are stored in the data portion 42 of the storage 104.

The proximity-position-information acquiring function 306 is the function which acquires, as the proximity position information, the position coordinates of the proximity position of the operating finger, etc., on the screen 3A when the proximity sensor 73 of FIG. 2 detects the proximity of the fingertip 11 which is the operating finger operating the screen 3A. The proximity-position-information storing function 307 is the function which causes the data portion 42 of the storage 104 to store the proximity position information of the operating finger on the screen 3A obtained by the proximity-position-information acquiring function 306.

The contact-position-information acquiring function 308 is the function which acquires, as the contact position information, the position coordinates of the contact position of the operating finger, etc., on the screen 3A when the touch sensor 72 detects the contact of the operating finger operating the screen 3A. The contact-position-information storing 309 the function is function which causes the data portion 42 of the storage 104 to store the contact position information of the operating finger on the screen 3A obtained by the contact-position-information acquiring function 308.

The superimposed-screen creation processing function 310 is the function which carries out processing of superimposing the finger image of the operating finger stored by the operating-finger-image storing function 25, onto the display information (the display information of the screen 3A) stored by the display-information storing function 304 to create the superimposed screen. The superimposed-screen creation processing function 310 is mainly made of the video processor 107A of the image portion 107. The data corresponding to the superimposed screen is created as the display information 9A. The superimposed-screen storing function 311 is the function which causes the data portion 42 of the storage 104 to store the display information of the superimposed screen obtained by the superimposed-screen creation processing function 310.

The display-information external output function 312 is the function which externally outputs, as the display information 9A, the display information stored by the display-information storing function 304 to the television 2 which is the external display apparatus through the communication 9 using the communication portion 106. The display information is the display information of only the original screen 3A not superimposed with the finger image or the display information of the superimposed screen superimposed with the finger image stored by the superimposed-screen storing function 31. Note that the selection of the display information to be used is appropriately controlled in accordance with a later-described processing flow.

[Processing Flow (1)]

Figure 4:
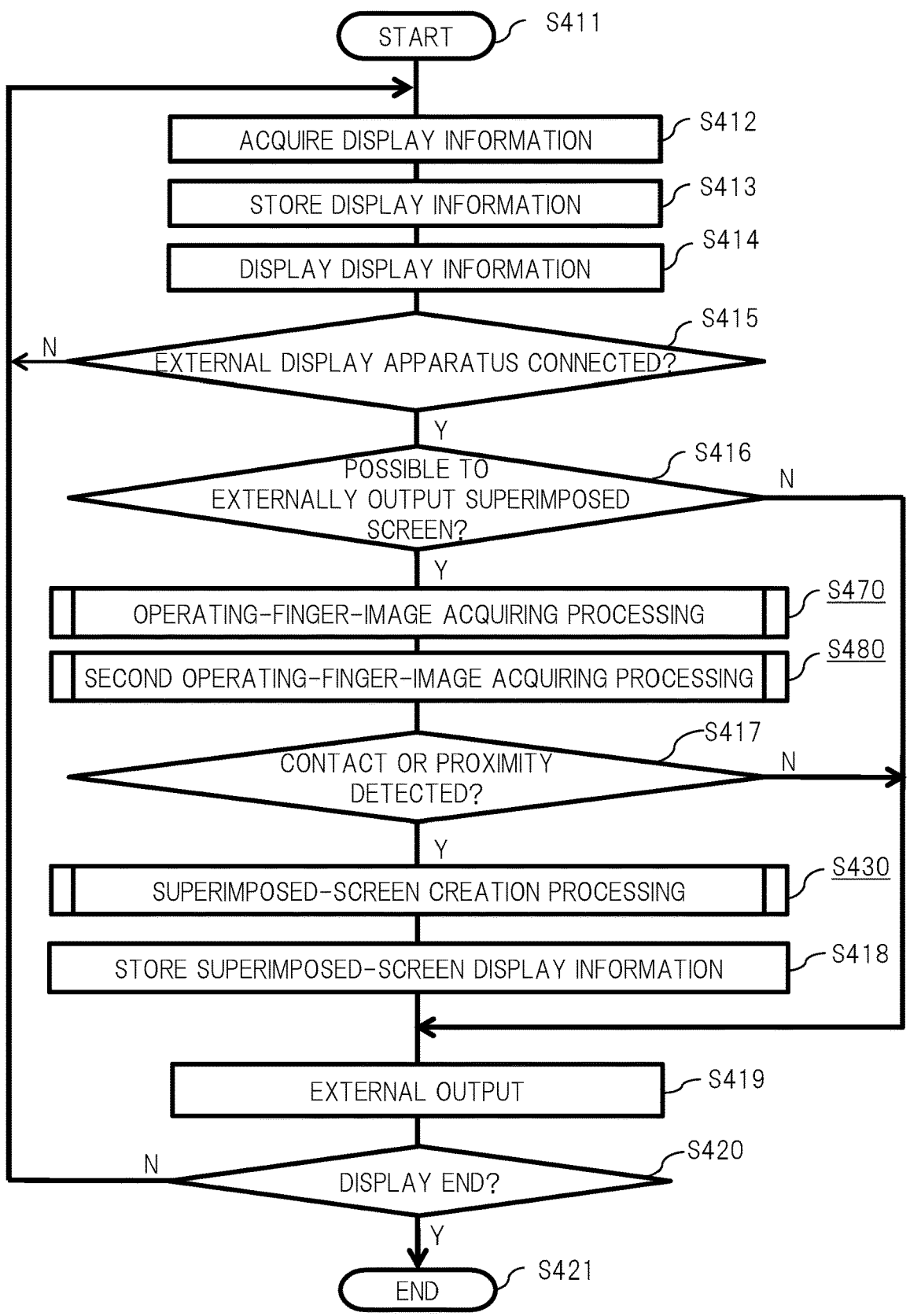
FIG. 4 illustrates a flow of main processing of the information display apparatus of the first embodiment.

FIG. 4 illustrates the flow of the processing (operating-finger superimposed-screen processing) of main functions of the smartphone 1 which is the information display apparatus of the first embodiment. Subjects of the processing flow of FIG. 4 are mainly the main controller 101 or the image portion 107 of FIG. 2 and the functions of FIG. 3. Hereinafter, the processing flow will be described also with reference to FIG. 3, etc. Note that step S470 is a step prepared in the case of the later-described third embodiment, and is omitted in the first embodiment. Step S480 is a step prepared in the case of the later-described fourth embodiment, and is omitted in the first embodiment.

In step S411, the processing flow is started. Then, first, in step S412, the smartphone 1 carries out display-information acquiring processing by using the display-information acquiring function 303. As a result, the display information to be displayed as the screen 3A on the display screen 3 is acquired. Next, in step S413, in the smartphone 1, the display information acquired by the processing of the above-described step S412 is stored in the data portion 42 of the storage 104 by the display-information storing function 304. Next, in step S414, in the image portion 107 (specifically, the video processor 107A), the display information stored by the processing of the above-described step S413 is displayed as the screen 3A on the display screen 3 of the display 71 of the touch panel 7. The processing of steps S412 to S414 is similar to the display processing for a display screen of a touch panel of a common smartphone.

Next, in step S415, the smartphone 1 determines whether the television 2 which is the external display apparatus has been connected or not. This determination can be made as, for example, the function/state of the communication portion 106. If it is determined in the above-described step S415 that the external display apparatus has not been connected (N), the processing returns to step S412. If it is determined in the above-described step S415 that the external display apparatus has been connected (Y), the processing transitions to step S416.

Next, in step S416, the smartphone 1 determines/checks if the display information 9A of the superimposed screen can be output to the television 2 which is the external display apparatus, in other words, if the setting allows external output. This means that the external output of the superimposed screen can be turned on/off as the setting or instruction based on the user's will. As a setting about the function in the embodiment, the external output of the superimposed screen can be initially previously set to be carried out (on) or not carried out (off). Also, the on/off of the external output of the superimposed screen may be previously set as a user setting. Also, every time the user requires display of the superimposed screen, the user may input the setting or instruction of the external output thereof.

Note that the function in the case of the related art corresponds to mirroring only for the contents of the screen 3A. However, the function 1002 of the first embodiment is the mirroring of the superimposed screen in which the finger image 6 is superimposed on the screen 3A. As the function of the first embodiment, both of the on/off of the mirroring only for the screen 3A and the on/off of the superimposed screen including the finger image 6 may be further set/designated by user settings, etc.

In the above-described step S416, if it is determined that the setting does not allow the external output of the display information of the superimposed screen (N), the processing transitions to step S419. If it is determined that the setting allows the external output of the display information of the superimposed screen (Y), the processing transitions to step S417.

Then, in step S417, based on the touch sensor 72 and the proximity sensor 73, the smartphone 1 determines whether the fingertip 11 of the operating finger has been in contact with or proximity with the display screen 3 (the corresponding screen 3A) of the display 71 of the touch panel 7. More specifically, the smartphone 1 determines, for example, whether the contact position information acquired by the contact-position-information acquiring function 308 is in the contact-position-information storing function 309 or whether the proximity position information acquired by the proximity-position-information acquiring function 306 is in the proximity-position-information storing function 307.

If it is determined in the above-described step S417 that the operating finger is in proximity (in a proximity state) or contact (in a contact state) therewith (Y), the processing transitions to step S430. If it is determined in the above-described step S417 that the operating finger is neither in proximity nor contact therewith (N), the processing transitions to step S419.

Figure 5:
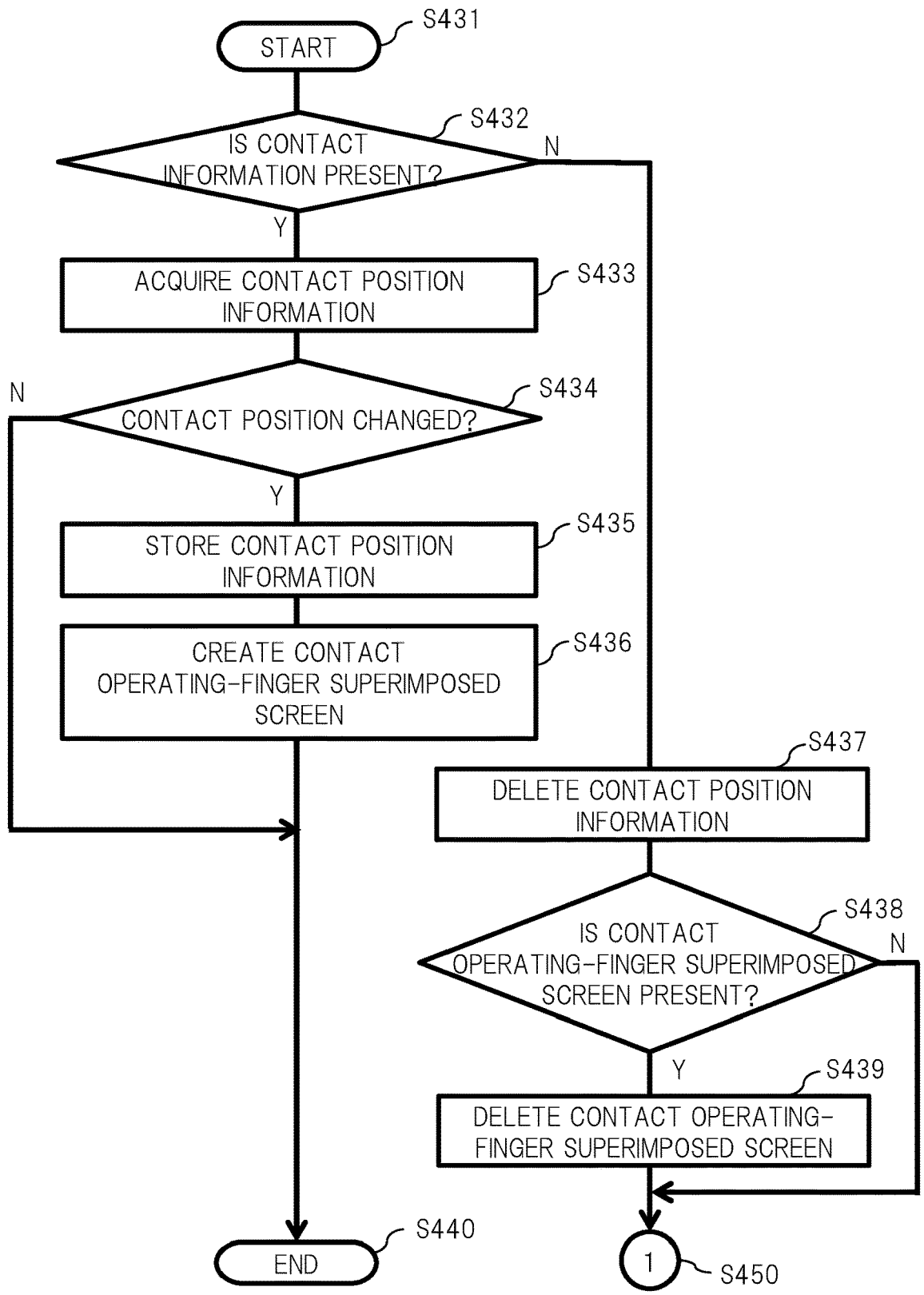
FIG. 5 illustrates part of the processing flow of step S430 of FIG. 4.
Figure 6:
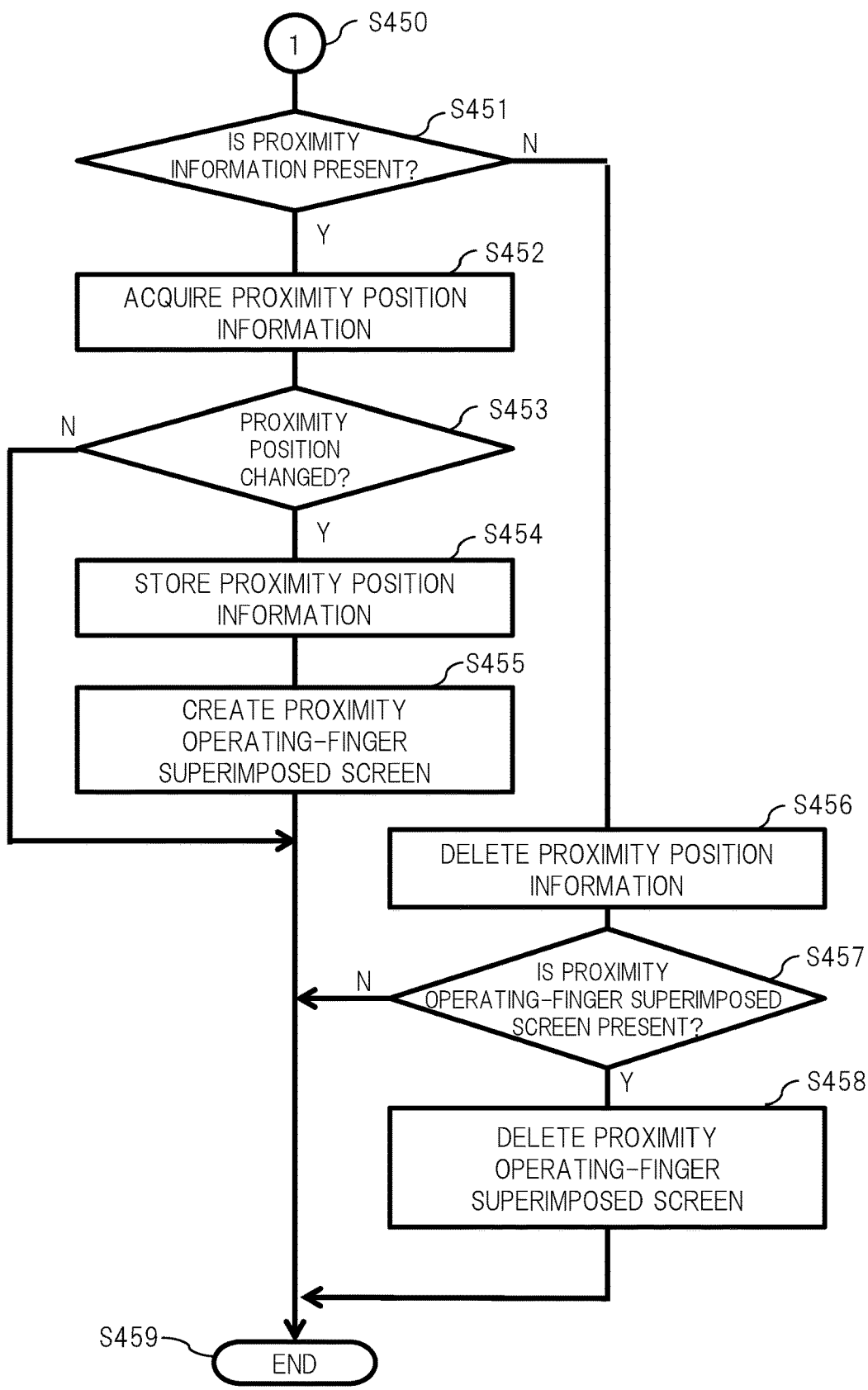
FIG. 6 illustrates another part of the processing flow of step S430 of FIG. 4.

In step S430, the smartphone 1 carries out superimposed-screen creation processing by using the superimposed-screen creation processing function 310. Step S430 is defined processing (subroutine), and details thereof are illustrated in FIG. 5 and FIG. 6. The superimposed-screen creation processing of step S430 is the processing of creating the superimposed screen in which the finger image 6 of the operating finger is superimposed on the display information displayed as the screen 3A on the display screen 3 of the smartphone 1.

FIG. 5 and FIG. 6 illustrate the processing flow of the above-described step S430. In step S431, the processing of step S430 is started. Then, in step S432, the smartphone 1 determines whether the fingertip 11 of the operating finger has been in contact with the display screen 3 of the touch panel 7, in other words, whether the contact position information is present. If it is determined in the above-described step S432 that the fingertip has been in contact therewith (Y), the processing proceeds to step S433. In step S433, the smartphone 1 acquires the contact position coordinates as the contact position information by using the contact-position-information acquiring function 307.

Next, in step S434, the smartphone 1 compares the contact position coordinates acquired in the above-described step S433 and the contact position coordinates stored in the contact-position-information storing function 308, and determines whether the contact position has changed. If it is determined in this step S434 that they coincide with each other, in other words, the contact position has not changed (N), the processing proceeds to step S440, and the processing flow of step S430 is ended. If it is determined in this step S434 that they do not coincide with each other, in other words, the contact position has changed (Y), the processing proceeds to step S435. In step S435, by using the contact-position-information storing function 309, the smartphone 1 stores the stored contact position coordinates so as to be changed and updated by the new contact position coordinates acquired in step S433. The state of the case of the changed contact position determined in step S434 corresponds to a case in which the user has moved the operating finger above the display screen 3 while being in contact therewith (a case of swiping operation, etc.)

Next, in step S436, the smartphone 1 creates the superimposed screen ("contact operating-finger superimposed screen") in which the finger image of the operating finger stored by the operating-finger-image storing function 305 is superimposed on the display information stored by the display-information storing function 304. Note that, in this processing, since the finger image 6 of the operating finger is superimposed on the screen 3A so as to represent the state in which the operating finger is in contact with the display screen 3 of the touch panel 7, the superimposed screen is also particularly described as "contact operating-finger superimposed screen". After the creation of the superimposed screen in the above-described step S436, the processing proceeds to step S440, and the processing flow of step S430 is ended.

If it is determined in the above-described step S432 that the operating finger is not in contact with the display screen 3 (N), the processing transitions to step S437. In step S437, the smartphone 1 deletes the contact position information including the contact position coordinates stored by the contact-position-information storing function 309.

Next, in step S438, the smartphone 1 determines whether the contact operating-finger superimposed screen has been stored by the superimposed-screen storing function 311 (whether it is present or not). If it is determined in step S438 that the superimposed screen has not been stored (N), the processing continues to the flow of FIG. 6 via a connector ("1") of step 450. If it is determined in step S438 that the superimposed screen has been stored (Y), the processing proceeds to step S439. In step S439, the smartphone 1 deletes the stored contact operating-finger superimposed screen.

Subsequently, in the flow of FIG. 6, first, in step S451, the smartphone 1 determines whether the operating finger has been in proximity with the display screen 3, in other words, whether the proximity position information is present. In the determination of step S451, if it is determined that the operating finger has been in proximity with the screen 3 (Y), the processing proceeds to step S452. In step S452, the smartphone 1 acquires the proximity position coordinates on the screen 3A by using the proximity-position-information acquiring function 305.

Next, in step S453, the smartphone 1 compares the proximity position coordinates acquired in the above-described step S452 and the proximity position coordinates stored in the proximity-position-information storing function 307, and determines whether the proximity position has changed. If it is determined in the above-described step S453 that the acquired proximity position coordinates and the stored proximity position coordinates coincide with each other, in other words, the proximity position has not changed (N), the processing proceeds to step S459, and the processing flow of step S430 is ended.

If it is determined in the determination of the above-described step S453 that the acquired proximity position coordinates and the stored proximity position coordinates do not coincide with each other, in other words, the proximity position has changed (Y), the processing proceeds to step S454. In step S454, in the smartphone 1, the stored proximity position coordinates are changed and updated based on the proximity position coordinates acquired in step S452, and are stored by the proximity-position-information storing function 307. The state of the case of the changed proximity position corresponds to the case in which the user has moved the operating finger without touching the display screen 3.

Next, in step S455, the smartphone 1 creates the superimposed screen in which the finger image 6 of the operating finger stored by the operating-finger-image storing function 305 is superimposed on the display information stored by the display-information storing function 304. Note that, in this processing, since the finger image 6 of the operating finger is superimposed on the screen 3A so as to represent the state in which the operating finger is in proximity with the display screen 3 of the touch panel 7, the superimposed screen is also particularly described as "proximity operating-finger superimposed screen". After the processing of step S455, the processing proceeds to step S459, and the processing flow of step S430 is ended.

If it is determined in step S451 that the operating finger has not been in proximity with the screen 3 (N), the processing proceeds to step S456. In step S456, the smartphone 1 deletes the stored proximity position coordinates.

Next, in step S457, the smartphone 1 determines whether the proximity operating-finger superimposed screen has been stored by the superimposed-screen storing function 311 (whether it is present or not). If it is determined in the above-described step S457 that the proximity operating-finger superimposed screen has not been stored (N), the processing proceeds to step S459, and the processing flow from step S450 is ended. If it is determined in the above-described step S457 that the proximity operating-finger superimposed screen has been stored (Y), the processing proceeds to step S458. In step S458, the smartphone 1 deletes the proximity operating-finger superimposed screen, brings the processing to step S459, and ends the processing flow of step S430.

Returning to the description of FIG. 4. After the superimposed-screen creation processing of step S430, the processing transitions to step S418. In step S418, in the smartphone 1, the display information of the superimposed screen created in the above-described step S430 is stored by the superimposed-screen storing function 311. As a matter of course, if the superimposed screen to be stored is not present, the storing is not carried out in this processing.

Next, in step S419, by using the communication portion 106, the smartphone 1 (specifically, the video output portion 107B of FIG. 2) externally outputs the display information 9A of the superimposed screen to the television 2 which is the external display apparatus. In this processing, if the processing has transitioned from step S418 to step S419, the smartphone 1 externally outputs the display information of the superimposed screen stored by the superimposed-screen storing function 311. More specifically, the finger image 6 of the operating finger is superimposed only on the display information 9A which is output from the smartphone 1 to the television 2. On the other hand, if the processing has transitioned from step S416 or step S417 to step S419, the smartphone 1 externally outputs the display information, which has not undergone the superimposed-screen creation processing of step S430, as the display information 9A. More specifically, the finger image 6 of the operating finger is not superimposed on the display information 9A which is output from the smartphone 1 to the television 2. In this case, the screen 3A of the smartphone 1 and the screen 4A of the television 2 have the same display information, and the finger image 6 of the operating finger is not superimposed to be displayed on the screen 4A.

Next, in step S420, the smartphone 1 determines whether display end has been instructed by a system, a program, the user, or the like. If it is determined in step S420 that the display end has not been instructed (N), the processing returns to step S412. If it is determined in step S420 that the display end has been instructed (Y), the processing proceeds to step S421, and the processing flow of FIG. 4 is ended. The processing flow of FIG. 4 is similarly repeated in chronological order.

When the smartphone 1 operates to follow the above-described processing flow, the superimposed screen having the same contents as those of the screen 3A of the smartphone 1 and being superimposed with the finger image 6 representing the state of the proximity or the contact of the fingertip 11 can be displayed as the screen 4A (the mirroring screen with the finger image 6) on the display screen 4 of the television 2 as illustrated in FIG. 1.

[Finger Image (Operating-Object Image)—(1)]

Next, details of the finger image 6 will be described. When the contact of the fingertip 11 which is the operating finger with the display screen 3 is detected by the touch sensor 72 of the above-described touch panel 7, the proximity of the operating finger is of course also detected by the proximity sensor 73 as a previous stage thereof. In the first embodiment, the smartphone 1 carries out both of the detection of the proximity state detected by the proximity sensor 73 and the detection of the contact state detected by the touch sensor 72 while distinguishing them from each other. The processing flow example of FIG. 4 to FIG. 6 includes these proximity detection and contact detection. In the processing flow example of FIG. 4 to FIG. 6, for the sake of explanation, the contact detection processing has been described first with reference to FIG. 5, and then, the proximity detection processing has been described with reference to FIG. 6. However, the order of these processing is not limited to this order. Even when the hand/finger 10 of the user becomes either one of the proximity and contact states with respect to the display screen 3, the state of the proximity or contact can be distinguished and detected by the processing flow of FIG. 4 to FIG. 6.

Furthermore, the smartphone 1 of the first embodiment controls the display mode of the finger image 6 of the superimposed screen, based on the above-described detection for distinguishing the proximity state and the contact state. In the first embodiment, two types that are the proximity operating-finger superimposed screen (S455) corresponding to the above-described proximity state and the contact operating-finger superimposed screen (S435) corresponding to the above-described contact state are prepared as the superimposed screens. In the first embodiment, in order to clarify the difference between the contact operating-finger superimposed screen (S435) and the proximity operating-finger superimposed screen (S455) for the user, the display of the finger image 6 of the operating finger is made different depending on the superimposed screen. More specifically, when the proximity of the operating finger is detected, the finger image 6 of the proximity operating-finger superimposed screen has a display mode (for example, a first display mode) representing the state in which the operating finger is in proximity with the screen 3A. When the contact of the operating finger is detected, the finger image 6 of the contact operating-finger superimposed screen has a display mode (for example, a second display mode) representing the state in which the operating finger is in contact with the screen 3A. The finger image 6 is configured so that the difference between the first display mode and the second display mode can be recognized by the user.

FIG. 7 illustrates configuration examples of display of the finger image 6. FIG. 7 (A) illustrates a finger image 6*a* of the operating finger of the contact operating-finger superimposed screen (S435) in the contact detection, and FIG. 7 (B) illustrates a finger image 6*b* of the operating finger of the proximity operating-finger superimposed screen (S455) in the proximity detection. These finger images 6 represent the display modes in the case in which the coordinate system on the display screen 4 is expressed as (X,Y,Z) as illustrated in the drawing. Note that a point p6*a* is an example of position coordinates serving as a reference when the finger image 6*a* is disposed on the screen 4A. In the present example, the point p6*a* is set to correspond to the detected contact position coordinates, and is set as the position corresponding to the fingertip 11 and a nail. Similarly, a point p6*b* is an example of position coordinates serving as a reference when the finger image 6*b* is disposed on the screen 4A. In the present example, the point p6*b* is set to correspond to the detected proximity position coordinates.

In the first embodiment, the state which is almost the same as the state in which the operating finger operating on the screen 3A of the smartphone 1 is visually recognized, in other words, the state schematically representing the operating state of the operating finger is achieved as the superimposed screen of the finger image 6 on the screen 4A of the television 2. Therefore, in the first embodiment, the finger image 6 of the operating finger of FIG. 1 and the finger images 6 (6*a*, 6*b*) of FIG. 7 are expressed as non-transparent finger images with a non-transparent background (the contents of the screen 3A).

These finger images 6 are the images of the case in which the operating finger is the right index finger, and are the images each schematically representing, for example, part of one finger from a nail tip to a vicinity of the root including the first joint and the second joint so as to represent the right index finger. These finger images 6 are the images in each of which the finger image 6 is tilted leftward from the lower side to the upper side while taking the Y direction as a longitudinal direction (the direction of the finger) in the coordinate system (X,Y,Z) in order to represent the right index finger. Because of this tilt, the user can recognize the finger image 6 as the right index finger. If the operating finger is the left index finger, the direction of the finger image 6 is configured to be the opposite (the image tilted rightward). Note that the details of the finger image 6 are not limited thereto, but may be, for example, a more detailed three-dimensional image or an image of the entire hand/finger 10.

The finger image 6*a* of FIG. 7 (A) is the image in which the contour of the finger image 6 (including the nail) is illustrated with a solid line as the first display mode in order to represent the state in which the operating finger (the fingertip 11) is in contact with the screen 3A. The finger image 6*b* of FIG. 7 (B) is the image in which the contour of the finger image 6 (including the nail) is illustrated with a dotted line as the second display mode in order to represent the state in which the operating finger (the fingertip 11) is in proximity with the screen 3A. By virtue of these, the finger images 6 (6*a*, 6*b*) of the two types are identified in terms of display. If the finger image 6 is changed from the finger image 6*b* of FIG. 7 (B) to the finger image 6*a* of FIG. 7 (A), in other words, the display mode is changed from the dotted line to the solid line, this change notifies the user that the operating finger has changed from the proximity state to the contact state with respect to the screen 3A.

In the first embodiment, as illustrated in FIG. 1, the smartphone 1 externally outputs, to the television 2, the superimposed screen (the display information 9A) in which the finger image 6 of the operating finger is superimposed on the display information of the screen 3A. The externally output superimposed screen is input to the television 2 via the transmission path of the communication 9. The television 2 receives/takes input of the superimposed screen (the display information 9B), and displays the superimposed screen as the screen 4A (the mirroring screen) on the display screen 4. On the screen 4A, the finger image 6 is superimposed and displayed on the contents of the screen 3A (in the surface vertical direction). As a result, only by viewing the screen 4A of the display screen 4 of the television 2, the user can recognize the state of the position, movement, etc., of the operating finger (the right index finger) which is operating the screen 3A of the smartphone 1.

Therefore, when the user visually recognizes the screen 4A (the mirroring screen) of the television 2 having the large screen, the user is not required to move his/her visual line to the display screen 3 of the smartphone 1 for, for example, checking operation, and the user can suitably operate the screen 3A of the smartphone 1 while keeping his/her visual line on the screen 4A. Thus, the cumbersomeness of the visual line movement required every time of the smartphone operation in the related art can be eliminated.

Also, according to the function of the above-described first embodiment, even when the user only brings the operating finger into proximity with the screen 3A of the smartphone 1, the proximity state or the non-contact state can be reflected as the display mode (the finger image 6*b*) of the finger image 6 to the contents of the screen 4A of the television 2. The user can easily identify the difference between the proximity and the contact as the state of the operating finger from the finger image 6. Therefore, according to the first embodiment, contact errors (for example, erroneous operation of GUI objects) of the operating finger with respect to the display screen 3 (the screen 3A) of the touch panel 7 can be prevented/reduced.

[Finger Image (Operating-Object Image)—(2)]

As described above, in the first embodiment, in order to clarify the difference between the contact operating-finger and superimposed screen the proximity operating-finger superimposed screen, the display of the finger image 6 of the operating finger is made different. This is merely an example, and various difference/display modes, representing methods, etc., can be applied. Examples of other difference/display modes are described below. As the difference/display modes of the finger image 6, colors (color types), density (or brightness), contrast, etc., may be used. For example, the shape and color of the finger image 6 of the operating finger is basically set by the initial settings or user settings. For example, in the finger image 6 of a certain setting, the right index finger is set to have an Asian skin color (yellow, beige, or the like). The user can optionally select the color. For example, the finger image 6*b* in the proximity state is set to have the above-described basic skin color (for example, yellow), and the finger image 6*a* in the contact state is set to have a deeper color, brighter color, or higher-contrast color than the basic skin color. Alternatively, the finger image 6*a* in the contact state may be set to have a processed color such as mixture of the basic skin color with another color (for example, red). Alternatively, by the user settings, the colors used in the cases of the two types, i.e., the proximity state and the contact state may be optionally selected (for example, white in the proximity state and red in the contact state).

Also, as the difference/display modes of the finger image 6, a plurality of display modes corresponding to identification of operating patterns (for example, touching, tapping, swiping, flicking, pinching, etc.) of the operating finger may be provided. For example, the finger image 6 in the touching operation can be set to have the red color in the contact state, and the finger image 6 in the swiping operation (operation in which the position is moved in the directions within the screen while keeping the contact state) can be set to have the blue color. Alternatively, as the difference/display modes of the finger image 6, a plurality of display modes corresponding to identification of the operation or function types (for example, on/off of buttons, icon dragging, bar sliding, page scrolling, etc.) of the GUI objects in the screen may be provided.

Also, as the difference/display modes of the finger image 6, the size thereof may be changed. For example, the finger image may have a first size in the proximity state, and the finger image may have a second size smaller than the first size in the contact state.

Also, the example of the finger image used as the operating-object image has been described. However, the operating object is not limited thereto, but the operating object with respect to the screen may be another object such as a touch pen, a pencil, a stylus, or the like. In such a case, the operating-object image is an image representing the operating object such as a touch pen, and the operating-object image is superimposed on the superimposed screen.

FIGS. 7(C) and (D) illustrate other examples of the operating-object image. In FIG. 7(C), an operating-object image 701 is an image representing the entire hand/finger 10 (for example, the right hand). In FIG. 7 (D), an operating-object image 702 is an image representing a touch pen (for example, a touch pen held by the right hand).

Also, regarding the operating-object image, in the case of the contact state, an image or audio may be output as an effect representing the contact. Examples of the effect image may include animation such as light or waves generated from a fingertip or a pen tip. Examples of the effect audio include contact sound. If the externally output display information 9A (the data of the superimposed screen) is accompanied by the audio, the display information 9A may be configured to include audio information, or audio information may be configured to be associated separately from the display information 9A.

Modification Example—Power Saving Control

Furthermore, as a modification example, control for power saving or the like (a corresponding power-saving control function) may be added to the functions of the above-described first embodiment as described below. When the superimposed screen (the screen 4A) with the finger image 6 displayed on the display screen 4 of the television 2 is visually recognized by the user as described above, the user is not visually recognizing the display screen 3 of the smartphone 1. Therefore, in the case of such a state, the smartphone 1 may be configured to be in a power saving state as intentional control in order to save power by, for example, turning off a backlight of the touch panel 7, which is necessary for visually recognizing the display screen 3. This is executed at predetermined timing as the control which is different from the automatic power saving control which is provided in the related-art smartphone. This power saving control may be achieved by using the visual-line detector 110 of the later-described embodiment. More specifically, when the visual line direction detected by the visual-line detector 110 is not directed toward the smartphone 1, the smartphone 1 stops display of the display screen 3. Also, on/off of application of such power saving control function can be set by the user settings.

[Detection of Proximity/Contact]

The detection of proximity/contact in the first embodiment will be described with reference to FIG. 8. In each embodiment, the proximity and the contact of the hand/finger 10 with respect to the display screen 3 are distinguished from each other. The contact is physical contact with the physical display screen 3. The proximity is physical approach to the display screen 3, and also means non contact. In the present specification, the proximity is an idea which does not include contact.

Figure 8:
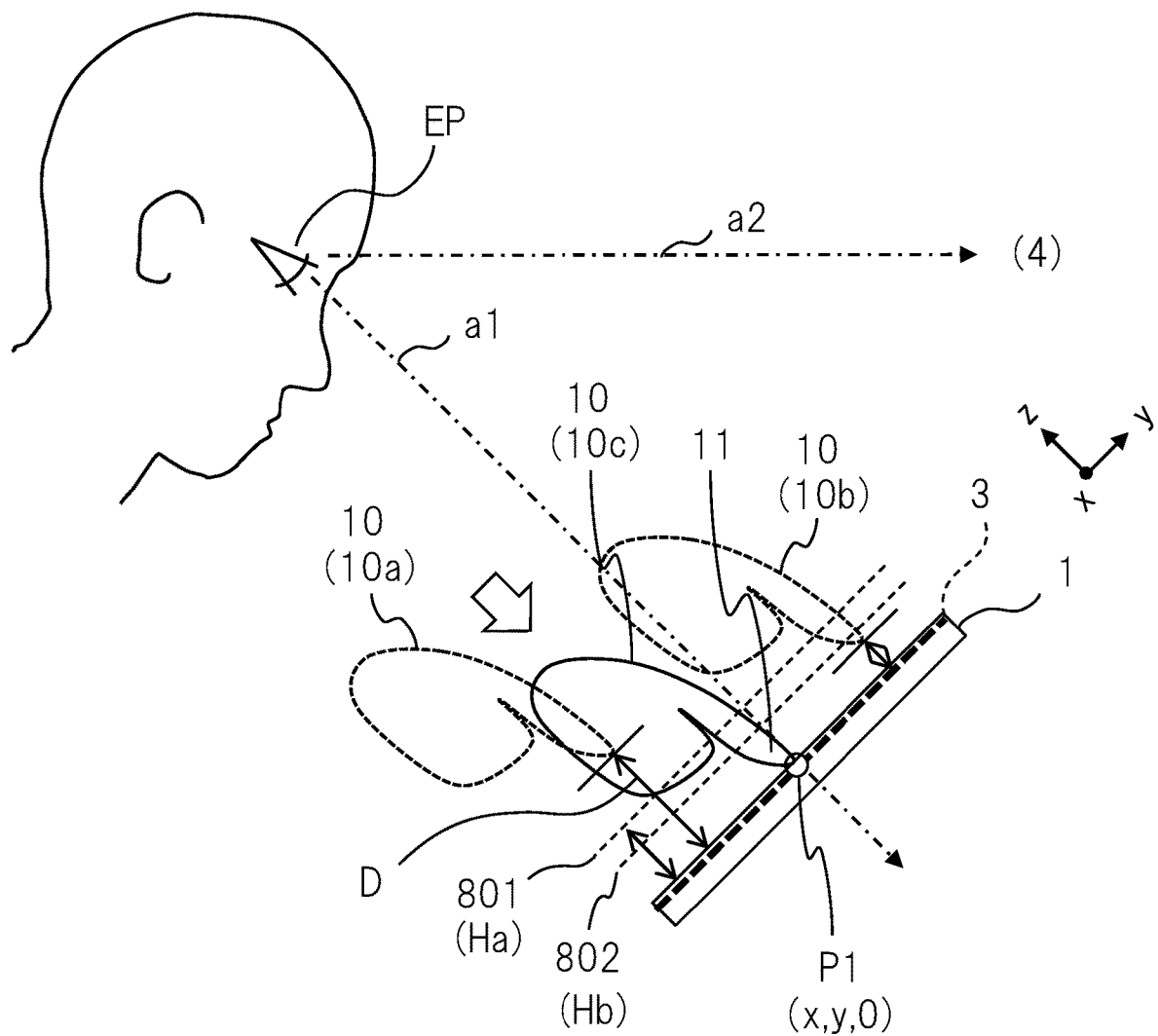
FIG. 8 illustrates a schematic explanatory diagram about proximity and contact between a hand/finger and a display screen when a user operates the smartphone in the first embodiment.

FIG. 8 is a schematic diagram in the first embodiment illustrating the state of a case in which the user is touching and operating a certain position P1 (x,y,0) above the display screen 3 (the corresponding screen 3A) of the smartphone 1, with the fingertip 11 of the operating finger, viewed from a side surface. Herein, the coordinate system of the display screen 3 is expressed by (x,y,z). The direction x and the direction y are the two orthogonal directions which constitute the display screen 3. The direction z is the surface vertical direction with respect to the display screen 3, and is the depth direction or the front/rear direction in which the fingertip 11 gets close to or away from the display screen 3. In a case of normal viewing, in other words, in a case other than the mirroring screen viewing, the user visually recognizes the display screen 3 (the screen 3A) in a visual line direction "a1" viewed from an eye point EP corresponding to his/her eyes. The display screen 3 herein is illustrated with a broken line. A visual line direction "a2" is an example of the visual line in a case of visual recognition of the display screen 4 of the unillustrated television 2 from the same eye point EP.

In the space region expanding from the display screen 3 toward the front side, the distance between the fingertip 11 and the display screen 3 in the direction z is represented by D. A threshold value 801 (Ha) illustrated with a broken line is an example of the threshold value of the distance D for determining the proximity state, and is set previously by a function. In a case in which the fingertip 11 is not in the contact state (z=0) while the distance D is within the threshold value Ha (0<D≤Ha), the smartphone 1 determines that this case is in "the proximity state", by using the distance D detected based on the proximity sensor 73. In a case in which the fingertip 11 is in contact with the display screen 3 (z=0), the smartphone 1 determines that this case is in "the contact state", by using the touch sensor 72.

The present example shows that the state of a hand/finger 10a is the state (non-proximity state) in which the distance D is larger than the threshold value Ha while the fingertip 11 is in neither proximity nor contact with the screen. Also, the present example shows that the state of a hand/finger 10b is "the proximity state" in which the distance D is within the threshold value Ha while the fingertip 11 of the operating finger is in proximity with the display screen 3. Also, the present example shows that the state of a hand/finger 10c is "the contact state" in which the distance D is zero while the fingertip 11 of the operating finger is in contact with the point P1 (position coordinates (x,y,0)) in a vicinity of the center of the display screen 3. At the time of the contact, the value in the direction z is zero.

As described above, in the first embodiment, the two types that are the proximity state and the contact state (three types when including the non-proximity state) are distinguished from each other as the states about operation carried out by the hand/finger, and are detected, and the superimposed screen in which the finger image 6 corresponding to each state is superimposed is displayed. The states are not limited thereto. Regarding the proximity/contact of the hand/finger 10, a plurality of gradual states (for example, a first proximity state, a second proximity state, etc.) may be distinguished and detected. Then, the finger image 6 corresponding to each state of the plurality of gradual states may be superimposed.

Regarding the determination of proximity and contact of the hand/finger 10, the first embodiment can most simply employ a method of determining the position of one point (a corresponding pixel) above the display screen 3. For example, the position (proximity position) at which the fingertip 11 is in closest proximity with the display screen 3 or the position (contact position) at which the fingertip is in contact with the display screen may be determined, and the position coordinates corresponding thereto may be acquired. Then, the position coordinates of the point (for example, the contact position) may be used as the position information for predetermined operation (for example, touch operation). Alternatively, the position coordinates of the point may be used as a reference position of disposition/display of the finger image 6 on the superimposed screen. The method is not limited thereto. More specifically, a method of determining two or more points or a region on the display screen 3 may be employed. For example, a method of, if the operating finger is the right index finger, determining the positions of two points that are a fingertip (nail) and a finger joint may be employed. The finger image 6 may be disposed/displayed in accordance with the two points.

Modification Example—Detection of Contact/Proximity

Also, as described below, as a modification example, control (a corresponding function) of detection/determination of proximity/contact using a threshold value may be added to the functions of the above-described first embodiment. The explanation thereof will be made with reference to the above-described FIG. 8. This modification example employs a method different from the above-described method regarding the proximity distance (the distance D) (in the direction z) between the operating finger and the display screen 3 of the touch panel 7 and determination of "the proximity state" and "the contact state". In the smartphone 1, a predetermined threshold value 802 (assumed as Hb) is set for the determination. The threshold value Hb may be the same as the threshold value 801 (Ha) or may be a different value. For example, as illustrated in FIG. 8, separately from the threshold value Ha, the threshold value Hb is set as a value smaller than the threshold value Ha (Ha>Hb). When the fingertip 11 of the operating finger is in proximity with the display screen 3 (z=0) so as to be within the predetermined threshold value Hb in the direction z (0<D≤Hb), the smartphone 1 determines this state as not the above-described "proximity state" but "the contact state". In other words, the contact state is a state in which the fingertip 11 is not actually in contact with the display screen 3 but is considered to be in the contact ("pseudo contact state") for predetermined operation (for example, touch operation).

When being in the pseudo contact state, the smartphone 1 acquires the corresponding pseudo contact position, and carries out processing for reception of the predetermined operation (for example, touch operation). In this modification example, the algorithm as described above is added or replaced in the determination of proximity/contact. In the manner, even when the operating finger is not in contact with the display screen 3, if the operating finger is in the above-described pseudo contact state, the user can operate the smartphone 1 (for example, touch operation with respect to an object at the position of the pseudo contact state). In the pseudo contact state, the smartphone 1 creates, as the superimposed screen, the contact operating-finger superimposed screen allowing the smartphone 1 to be operated. In the contact operating-finger superimposed screen, the finger image 6 is expressed as, for example, the finger image 6a of FIG. 7 (A) to be illustrated with a solid line.

[Proximity Sensor]

A configuration example of the proximity sensor 73 will be described. As the proximity sensor 73, the first embodiment employs the proximity sensor of the electrostatic capacitance type united to the above-described touch panel 7. The proximity sensor has a configuration in which electrostatic capacitance elements or the like are disposed in a cell group of the display 71 (for example, a liquid crystal display) of the touch panel 7. The proximity sensor detects electrostatic capacitance changes corresponding to the distance to an object such as the finger on the display 71 by using the electrostatic capacitance elements. The smartphone 1 can calculate the position, distance, etc., of the fingertip 11 above the display screen 3 from the detection information of the proximity sensor. More specifically, the electrostatic capacitance type includes, for example, a surface capacitive type and a project capacitive type. When the project capacitive type is used, minute capacitance changes before the contact of the finger with the surface can be detected by improving the detection sensitivity of the electrostatic capacitance changes. In the manner, the proximity position, etc., in the proximity state before the contact of the fingertip 11 with the display screen 3 can be detected with high accuracy.

An ultrasonic sensor can be also employed as the proximity sensor 73. The ultrasonic sensor emits ultrasonic waves from an ultrasonic-wave emitting part to an object such as a finger, receives the reflected waves from the object through an ultrasonic-wave incoming part, and detects it. The ultrasonic sensor is mounted on part of the body of the smartphone 1. The smartphone 1 can calculate the position, distance, etc., of the fingertip 11 above the display screen 3 from the detection information of the ultrasonic sensor.

An optical sensor such as an infrared sensor can be also employed as the proximity sensor 73. The infrared sensor emits infrared rays from an infrared-ray radiation part to an object such as a finger, captures a video on which the reflected waves from the object are reflected, by using an infrared camera, and detects it. The infrared sensor is mounted on part of the body of the smartphone 1. The smartphone 1 can calculate the position, distance, etc., of the fingertip 11 above the display screen 3 from the detection information of the infrared sensor. For example, a facial recognition function mounted on a common smartphone is achieved by using an optical sensor and a camera as described above. This facial recognition function can be also used for, for example, detection of proximity of the operating finger in the embodiment.

A three-dimensional distance sensor such as Laser Imaging Detection And Ranging (LiDAR) can be also employed as the proximity sensor 73. The LiDAR is mounted on, for example, a back surface region of the display screen 3 of the smartphone 1, a frame region of the body, etc. The LiDAR emits laser from a laser radiation part to an object such as a finger, optically receives the reflected waves from the object, and detects it. The LiDAR emits the laser so as to, for example, scan a two-dimensional surface region. The smartphone 1 can calculate the position, distance, etc., of the fingertip 11 above the display screen 3 from the detection information of the LiDAR.

An optical sensor united to the touch panel 7 can be also employed as the proximity sensor 73. The united optical sensor has a configuration in which a group of optical sensor elements is disposed in a cell group of the display 71 (for example, a liquid crystal display) of the touch panel 7. The optical sensor elements detect light reception intensity. The smartphone 1 can calculate the position, distance, etc., of the fingertip 11 above the display screen 3 from the detection information of the united optical sensor.

Effect (1), Etc

As described above, according to the information display apparatus of the first embodiment, when the screen having the same contents as those of the screen of the mobile information terminal is to be displayed on the external display apparatus, in other words, when mirroring about the screens is to be carried out, the cumbersomeness such as the visual line movement of the user can be eliminated or reduced, and the operability and the usability for the user can be enhanced. The user can suitably operate the screen of the touch panel of the mobile information terminal with his/her hand while fixing his/her visual line onto the mirroring screen having the large screen of the external display apparatus. When the user visually recognizes the screen of the mobile information terminal such as the smartphone 1 as the mirroring screen having the large screen of the external display apparatus such as the television 2, the user does not need to move his/her visual line to the touch panel of the mobile information terminal every operation time, and the user can suitably operate the touch panel with his/her hand while keeping his/her visual line on the screen of the external display apparatus. In other words, the visual line movement of the user between the screen of the information display apparatus and the screen of the external display apparatus can be eliminated or reduced. Therefore, the cumbersomeness of the visual line movement needed every operation time on the mobile information terminal can be eliminated or reduced, and the operability and the usability for the user can be made higher than those of the related art.

In the first embodiment, all the mirroring functions about the screens, particularly the function of the external output of the superimposed screen of the operating finger, are achieved only by the single smartphone 1, and any particular function is unnecessary to be mounted on the external display apparatus side. Therefore, not only the television 2 but also various external display apparatuses can be employed.

Note that the first embodiment has been described while exemplifying the case in which the display screen 4 of the television 2 is larger in size than the display screen 3 of the smartphone 1. The present invention is not limited thereto, and a case in which the screen of the external display apparatus is the same as or smaller in size than the screen of the information display apparatus can be also employed.

Also, in the related art, the user sometimes places the smartphone screen, which is held by his/her hand, at a position close to the visual line with respect to the television screen, and takes an action of alternately looking at both of them. In such a case, the user needs to take an action of, for example, raising his/her arm. However, according to the first embodiment, such an action is unnecessary, and this is convenient for the user.

Second Embodiment

A second embodiment will be described with reference to FIG. 9. Basic configurations of the second embodiment, etc., are similar to those of the first embodiment. Hereinafter, constituent parts of the second embodiment, etc., which are different from those of the first embodiment, will be mainly described. In the second embodiment, the finger image 6 of the operating finger on the superimposed screen is not the above-described non-transparent finger image (FIG. 1, FIG. 7), but is expressed as a transparent finger image transmitting the background (the contents of the screen 3A).

[Superimposed Screen]

Figure 9:
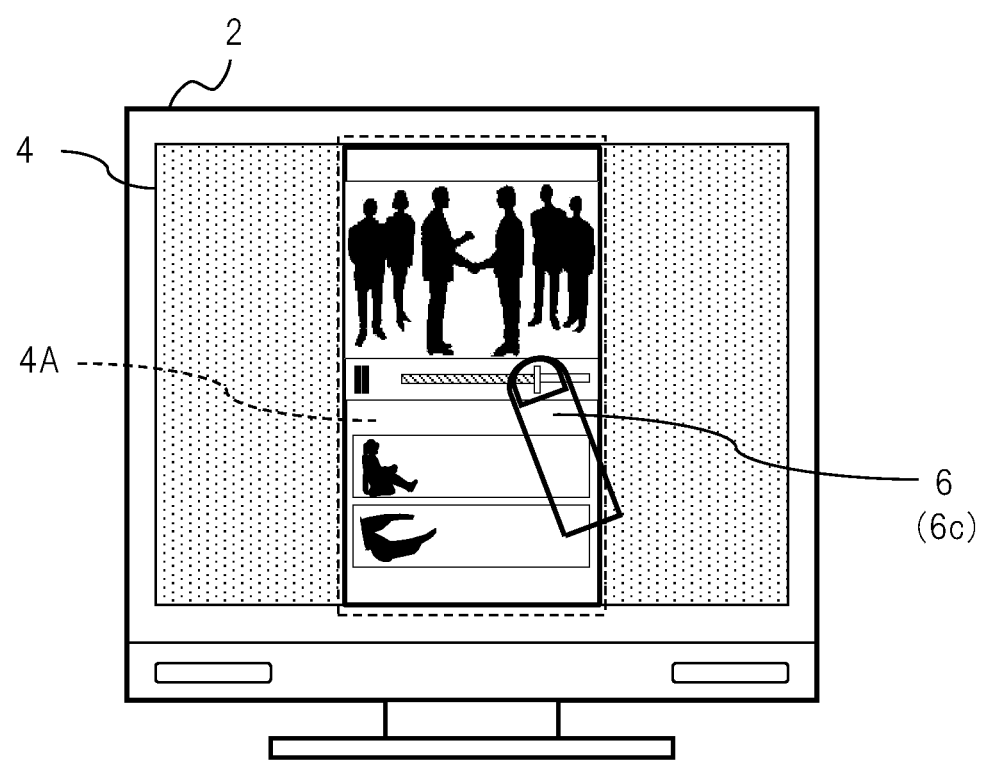
FIG. 9 illustrates a display example of a superimposed screen of an external display apparatus in a second embodiment.

FIG. 9 illustrates an example in the second embodiment in which a finger image 6c which is the transparent finger image is superimposed and displayed as the finger image 6 of the operating finger on the screen 4A of the display screen 4 of the television 2. The contour (including the nail) of the finger image 6c is illustrated with a solid line, and a region within the contour is illustrated to be transparent. In the second embodiment, the finger image 6c transmits the background. Therefore, while the user visually recognizes the screen 4A which is the superimposed screen, the user can visually recognize the contents (for example, a GUI object) of the screen 3A, which is the part behind the operating finger, without being blocked by the operating finger operating on the screen 3A. As a result, in the second embodiment, contact errors, etc., of the operating finger due to the user can be prevented/reduced.

In the example of FIG. 9, the position (proximity position or contact position) of the fingertip of the finger image 6c is on the GUI object such as a slide bar. Therefore, this object is viewable behind the fingertip of the finger image 6c, and thus, the user can easily carry out operation such as touching, swiping, etc., with respect to the object.

In the first embodiment, since the finger image 6 on the superimposed screen is the non-transparent finger image, it is advantageous that the user can more easily recognize the state of operation of the hand/finger 10. On the other hand, in the second embodiment, since the finger image 6 on the superimposed screen is the transparent finger image, it is advantageous that the user can more easily recognize the contents of the original screen 3A which is behind the hand/finger.

As a modification example of the second embodiment, the finger image 6 may be a semi-transparent finger image. In the manner, there is an effect that the background of the operating finger can be easily seen.

Also, in a modification example of the second embodiment, as an example in which the finger image 6 is made different between the proximity state and the contact state, the finger image 6 may be a transparent finger image in the proximity state and a non-transparent finger image in the contact state. Alternatively, opposingly, the finger image 6 may be a non-transparent finger image in the proximity state and a transparent finger image in the contact state.

Third Embodiment

The third embodiment will be described with reference to FIG. 10 and following drawings. The above-described first embodiment has been described on the assumption that the operating finger, with which the user operates the display screen 3, is the right index finger. The operating finger is not limited thereto, and the hand/finger varies depending on the user, and the above-described finger image 6 (operating-object image) can be an image corresponding to this different hand/finger. For example, if the user is right-handed, the operating finger may be the right index finger. However, if the user is left-handed and the left index finger is actually used for operation, no change from the above-described finger image 6 representing the right index finger makes the user uncomfortable. The third embodiment additionally includes a function allowing the user to set the finger image corresponding to the operating finger so as not to make the user uncomfortable in terms of operation/visual recognition even when the operating finger of the user varies. This function is a function which previously stores finger images of a plurality of types in the smartphone 1 and allows the user, by the user settings, to select and use the finger image of the type corresponding to the operating finger used by the user.

[Function Block (3)]

With reference to above-described FIG. 3, a function block configuration example of the smartphone 1 of the third embodiment will be described. The third embodiment further includes the operating-finger-image acquiring function 313 illustrated in FIG. 3. The operating-finger-image acquiring function 313 is a function which acquires the finger image 6 of the operating finger used when the user operates the display screen 3 of the smartphone 1. The finger images of the operating fingers of the plurality of types are previously stored in the data portion 42 of the storage 104 of FIG. 2. For example, in the initial settings, the operating finger is the right index finger, and the finger image 6 as described above which represents the right index finger is employed. The storage 104 stores the finger images corresponding to the fingers of the right hand and the left hand other than the right index finger.

For example, in response to the designation of the operating finger (for example, the left index finger) in the user settings set by the user, the operating-finger-image acquiring function 313 may read out and acquire the data of the finger image of the operating finger from the data portion 42. Then, the operating-finger-image acquiring function 313 stores the acquired finger image data by using the operating-finger-image storing function 305. The operating-finger-image storing function 305 retains the finger image of the operating finger, which is to be superimposed on the superimposed screen, for processing.

FIG. 10 illustrates examples of the finger images 6 (corresponding finger image data) of the plurality of types. In the present example, the finger images 6 of four types are prepared as (1) a finger image 6A of the right index finger, (2) a finger image 6B of the right thumb, (3) a finger image 6C of the left index finger, and (4) a finger image 6D of the left thumb. For example, by the user settings, the user selects the finger image 6C of the left index finger from these options, and sets the finger image as the finger image 6 of the operating finger. In other words, the user can change the operating finger to be used, from the right index finger of the initial setting to the left index finger.

The lower side of FIG. 10 illustrates an example in which, for example, the finger image 6C of the left index finger is superimposed and displayed on the superimposed screen (the screen 4A) as the finger image 6 of the operating finger selected from the finger images 6 of the plurality of operating fingers. The finger image 6 of the operating finger is changed from the finger image 6A of the right index finger of the initial setting to the finger image 6C of the left index finger. In this manner, in the third embodiment, the user can set his/her suitable operating finger and the finger image 6 corresponding thereto. Therefore, for example, even in the case of the left-handed user, suitable visual recognition and operation about the mirroring screen can be carried out.

[Processing Flow (3)]

The flow of main processing (operating-finger superimposed-screen processing) of the third embodiment will be described with reference to the above-described FIG. 4. As a mainly different constituent point from the first embodiment, the third embodiment additionally includes step S470 between step S416 and step S417. Step S470 is defined processing (subroutine), and is operating-finger-image acquiring processing using the operating-finger-image acquiring function 313. Step S470 is carried out when external output of the superimposed screen can be carried out (Y) in step S416.

Figure 11:
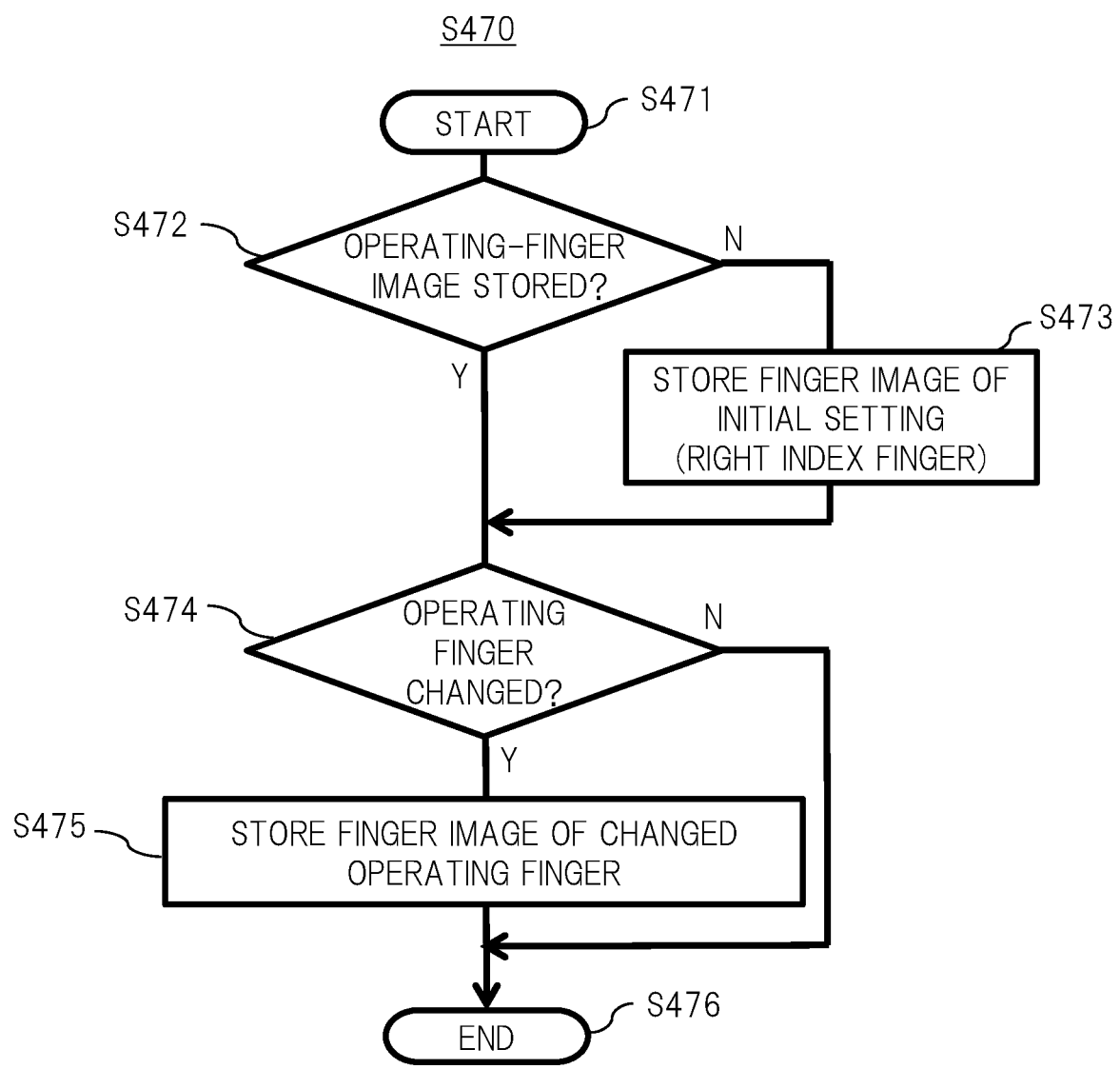
FIG. 11 illustrates a processing flow of step S470 in the third embodiment.

FIG. 11 illustrates the processing flow of the operating-finger-image acquiring processing of step S470. In step S471, the processing of step S470 is started. Then, in step S472, the operating-finger-image acquiring function 313 of the smartphone 1 determines whether the finger image of the operating finger used when the user carries out the operation has been stored by the operating-finger-image storing function 305. In the above-described step S472, if it is determined that the finger image of the operating finger has been stored (Y), the processing transitions to step S474. If it is determined that the finger image of the operating finger has not been stored (in other words, initial state) (N), the processing transitions to step S473.

In step S473, the smartphone 1 selects the finger image of the right index finger as the operating finger for the initial setting from among the plurality of finger images stored in the data portion 42 of the storage 104, and stores the selected finger image of the right index finger by using the operating-finger-image storing function 305. Then, the processing transitions to step S474.

Step S474 is the processing which determines whether the user has instructed to change the operating finger. For example, on a user setting screen provided by the smartphone 1, the user selects and designates the operating finger or the finger image to be used from a list of options of the operating fingers or the corresponding finger images. In step S474, the operating-finger-image acquiring function 313 acquires the instruction information regarding the selected and designated finger image of the operating finger, and checks whether the operating finger of the initial setting (the right index finger) has been changed. In step S474, if it is determined that there is the instruction to change the operating finger (Y), the processing proceeds to step S475. If it is determined that there is no instruction to change the operating finger (N), the processing proceeds to step S476.

In step S475, the smartphone 1 selects and reads out the finger image data of the changed operating finger (for example, the left index finger), which has been selected/instructed by the user, from among the plurality of finger images stored in the data portion 42 of the storage 104, and stores the finger image of the changed operating finger by using the operating-finger-image storing function 305. Then, in step S476, the processing flow of step S470 is ended. Even when there is no change instruction in step S474 (N), the processing flow of step S470 is ended since the finger image of the operating finger has already been stored by using the operating-finger-image storing function 305.

As a modification example of the third embodiment, note that the finger image data of the plurality of types may be stored in not the smartphone 1 but an external server or the like, and the smartphone 1 may refer to the finger image data in the external server or the like. Also, regarding the designation of the operating finger set in the user settings by the user, predetermined operation therefor may be defined previously so that designation or switching of the operating finger can be instantly carried out by the predetermined operation on the smartphone 1 during viewing.

Fourth Embodiment

The fourth embodiment will be described with reference to FIG. 12 and following drawings. In the above-described first embodiment, etc., the cases in which the operating finger about operation such as touching/tapping, swiping, etc., is single finger (for example, the right index finger) have been described. In the fourth embodiment, a case of simultaneous use of a plurality of operating fingers will be described. The function of the fourth embodiment includes a function to superimpose and display the finger images (operating-object images) corresponding to the plurality of operating fingers. Particularly, in the present example, a case of pinching operation (corresponding enlarging/reducing action) with respect to a GUI object or an image on the screen 3A carried out by using two operating fingers (for example, the right index finger and the right thumb) will be described.

Generally, in the case of pinching operation, the operating fingers in contact with the display screen 3 of the touch panel 7 at the same time are often two fingers. Hereinafter, in order to identify the two operating fingers for the sake of explanation, the finger in first contact with the display screen 3 is assumed as a first operating finger, and the finger in next contact with the screen is assumed as a second operating finger. When the first operating finger on one side is considered as a main finger, note that the second operating finger on the other side may be considered as a sub or assisting finger.

[Function Blocks (4)]

With reference to the above-described FIG. 3, a function block configuration example of the smartphone 1 of the fourth embodiment will be described. The fourth embodiment additionally includes the second operating-finger-image acquiring function 314 and the second operating-finger-image storing function 315 relative to the configuration of the third embodiment which uses the operating-finger-image acquiring function 313. The operating-finger-image acquiring function 313 and the operating-finger storing function 305 described above are the functions about the first operating finger in the fourth embodiment, and the second operating-finger-image acquiring function 314 and the second operating-finger-image storing function 315 are the functions about the second operating finger.

The second operation-assisting-finger-image acquiring function 314 is the function which acquires the finger image of the second operating finger, which operates the touch panel 7. For example, based on the detection result of the touch sensor 72, the finger (corresponding contact position) in the first contact with the display screen 3 in chronological order is considered to be the first operating finger (the corresponding first contact position). If there is another finger (corresponding another contact position) in contact with the display screen 3 within a predetermined period of time after the contact, the finger is considered to be the second operating finger (corresponding second contact position). For example, the right index finger serves as the first operating finger, and the right thumb serves as the second operating finger.

[Finger Images of a Plurality of Operating Fingers]

Figure 12:
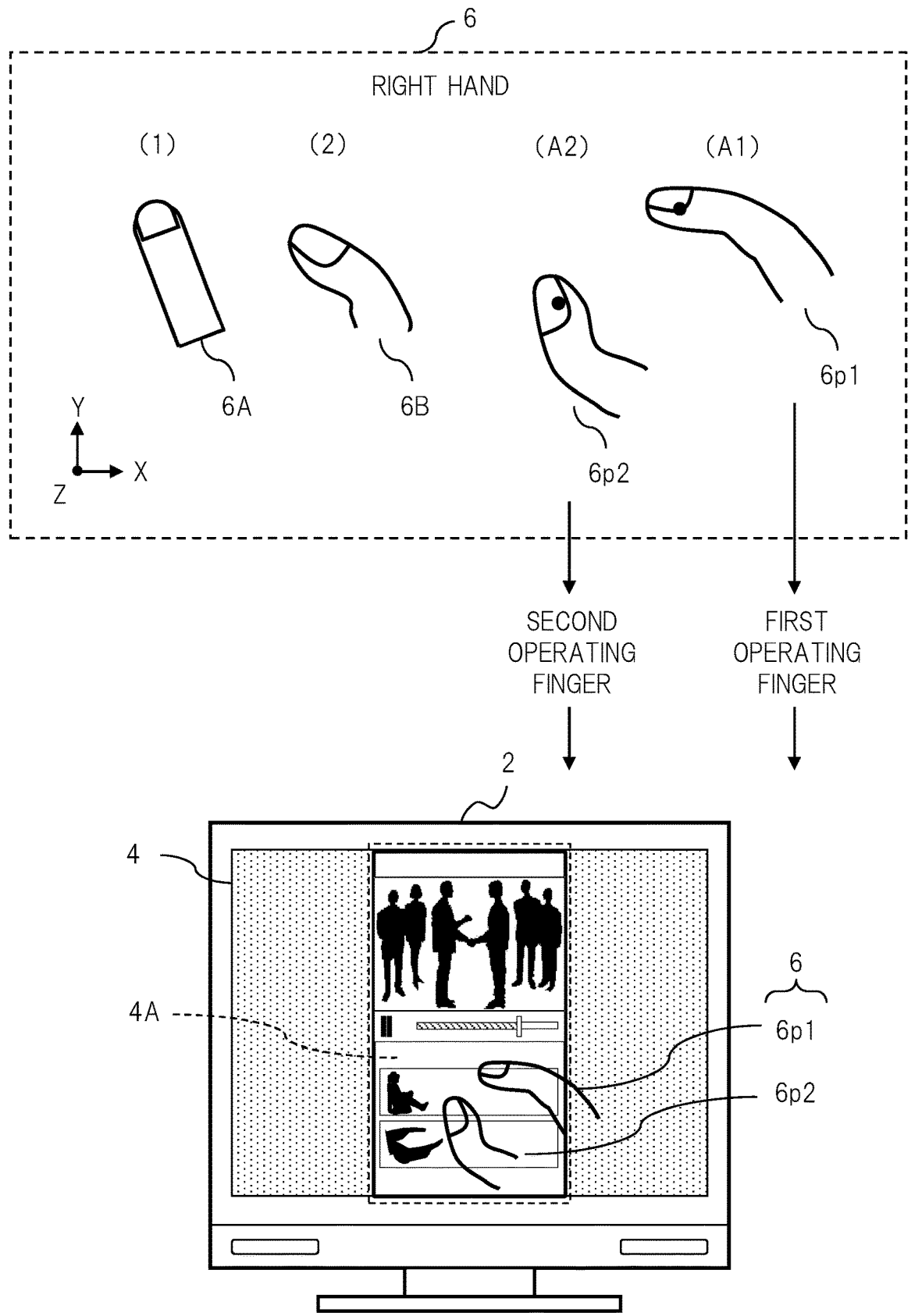
FIG. 12 illustrates display examples of finger images of a plurality of operating fingers and a superimposed screen of the external display apparatus in a fourth embodiment.

FIG. 12 illustrates examples of part of the finger images of a plurality of types previously stored in the data portion 42 in the case corresponding to the pinching operation in the fourth embodiment. In the case of the right hand, not only the above-described finger images 6A and 6B but also finger images 6*p*1 and 6*p*2 capable of supporting the pinching operation are prepared. FIG. 12 (A1) illustrates the finger image 6*p*1 of the right index finger in the pinching operation, and FIG. 12 (A2) illustrates the finger image 6*p*2 of the right thumb in the pinching operation.

The operating-finger-image acquiring function 313 acquires the finger image (for example, the finger image 6*p*1) corresponding to the first operating finger from the data of the plurality of finger images as shown in the examples of FIG. 12. Similarly, the second operating-finger-image acquiring function 314 acquires the finger image (for example, the finger image 6*p*2) corresponding to the second operating finger. Even in a case of another operating finger, the finger image can be similarly selected. The second operating-finger-image storing function 315 is the function which stores the finger image of the second operating finger acquired by the second operating-finger-image acquiring function 314.

When two operating fingers in contact with the screen 3A at the same time are detected, the smartphone 1 of the fourth embodiment carries out processing while considering the operating fingers as a set of the first operating finger (for example, the right index finger) and the second operating finger (for example, the right thumb).

[Processing Flow (4)]

The flow of the operating-finger superimposed-screen processing in the fourth embodiment will be described with reference to the above-described FIG. 4. The flow of the fourth embodiment additionally includes step S480 relative to the flow of the third embodiment of FIG. 4. The smartphone 1 acquires the finger image of the first operating finger in step S470, and acquires the finger image of the second operating finger in next step S480.

Figure 13:
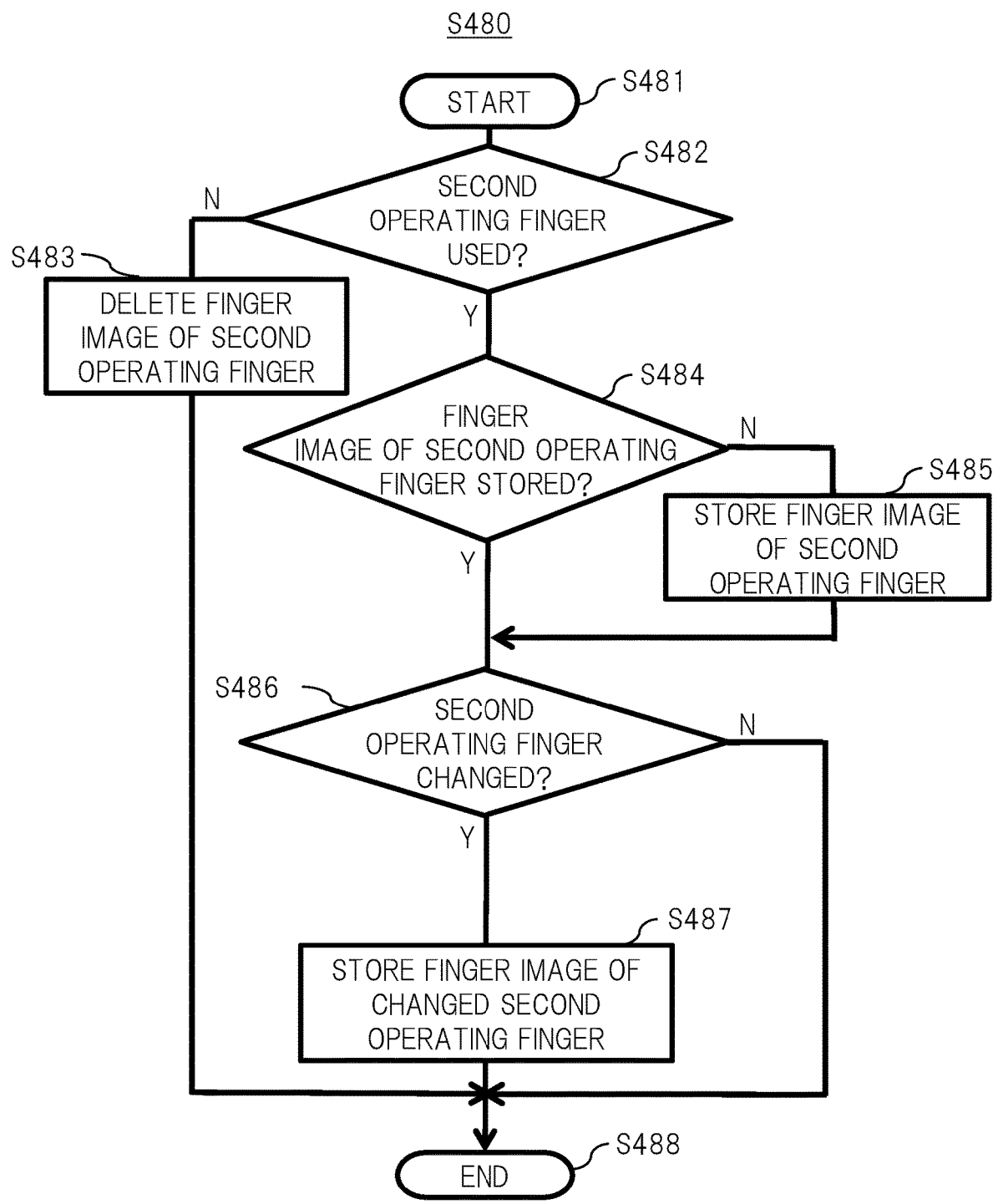
FIG. 13 illustrates a processing flow of step S480 in the fourth embodiment.

FIG. 13 illustrates the flow of second operating-finger-image acquiring processing of step S480. In step S481, the processing of step S480 is started. Then, first, in step S482, the second operating-finger-image acquiring function 314 of the smartphone 1 determines whether the second operating finger has been used. In the fourth embodiment, if it is detected by using the touch sensor 72 that the number of the operating fingers in contact with the display screen 3 (the screen 3A) at the same time is two (in other words, if the first contact position and the second contact position are detected), the smartphone 1 determines that the second operating finger as well as the first operating finger has been used.

In step S482, if it is determined that the second operating finger has not been used (N), the processing proceeds to step S483. If it is determined that the second operating finger has been used (Y), the processing proceeds to step S484. In step S483, the smartphone 1 deletes the finger image of the second operating finger, brings the processing to step S488, and ends the processing of step S480.

In step S484, the smartphone 1 determines whether the finger image of the second operating finger has been stored by the second operating-finger-image storing function 315. If it is determined in step S484 that the finger image of the second operating finger has been stored (Y), the processing proceeds to step S486. If it is determined in step S484 that the finger image of the second operating finger has not been stored (in other words, initial state) (N), the processing proceeds to step S485. In step S485, the smartphone 1 selects the finger image of the second operating finger (for example, the right thumb) from among the plurality of finger images stored in the data portion 42 of the storage 104, and stores the selected finger image of the second operating finger by using the second operating-finger-image storing function 315. Then, the processing proceeds to step S486.

In step S486, the second operating-finger-image acquiring function 314 of the smartphone 1 determines whether the user has instructed to change the second operating finger. In step S486, if it is determined that the change of the second operating finger has been instructed (Y), the processing proceeds to step S487. If it is determined that the change of the second operating finger has not been instructed (N), the processing proceeds to step S488. In step S487, the smartphone 1 selects the finger image corresponding to the second operating finger, which has been instructed by the user, from among the plurality of finger images stored in the data portion 42 of the storage 104, and changes the finger image of the used second operating finger to the finger image. In step S487, the smartphone 1 stores the changed finger image of the second operating finger by using the second operating-finger-image storing function 315. Then, in step S488, the processing of step S480 is ended. If it is determined in step S486 that there is no change (N), the processing of step S480 is ended at step S488 since the finger image of the second operating finger has already been stored by the second operating-finger-image storing function 315.

In the fourth embodiment, in the flow of FIG. 4, part of the contents of the superimposed-screen creation processing of step S430 is different from the above-described contents. As different constituent points, in the contact operating-finger superimposed-screen creation processing of step S436 of FIG. 5 and the proximity operating-finger superimposed-screen creation processing of step S455 of FIG. 6, each of the superimposed screens may be the superimposed screen on which the finger images of the two operating fingers which are the first operating finger and the second operating finger are superimposed.

The lower side of FIG. 12 illustrates an example in which the finger images 6 (6p1, 6p2) of the two operating fingers in the pinching operation are superimposed and displayed on the screen 4A of the television 2.

As described above, in the fourth embodiment, the user can suitably carry out pinching operation with two operating fingers with respect to the screen 3A of the smartphone 1 while visually recognizing the screen 4A of the television 2. Also, the two operating fingers are displayed in different display modes depending on the proximity state or the contact state for each of the operating fingers. The embodiment is not limited to the pinching operation, but can be similarly employed also to the case in which the screen is operated with two operating fingers at the same time. Also in the case in which three or more operating fingers are used at the same time, similar processing can be employed to each of the operating fingers. Also, as a modification example of the fourth embodiment, for example, when there are two operating fingers (the first operating finger and the second operating finger) at the same time, these fingers can collectively constitute one finger image (for example, an image of the entire right hand).

Fifth Embodiment

The fifth embodiment will be described with reference to FIG. 14 and following drawings. In the above-described third embodiment and the fourth embodiment, the operating finger (s) (the finger (s) reflected to the finger image (s) 6) to be used can be designated by the user. In the fifth embodiment, it is unnecessary to designate the operating finger or the finger image designated by the user, and the smartphone 1 automatically determines the operating finger, and correspondingly creates the finger image.

[Function Blocks (5)]

With reference to the above-described FIG. 3, a function block configuration example of the smartphone 1 of the fifth embodiment will be described. The fifth embodiment includes the operating-finger determining function 316 as a mainly different constituent point. The operating-finger determining function 316 is the function which automatically determines the operating finger of the user by using the camera 5 or the like.

[Processing Flow (5)]

Figure 14:
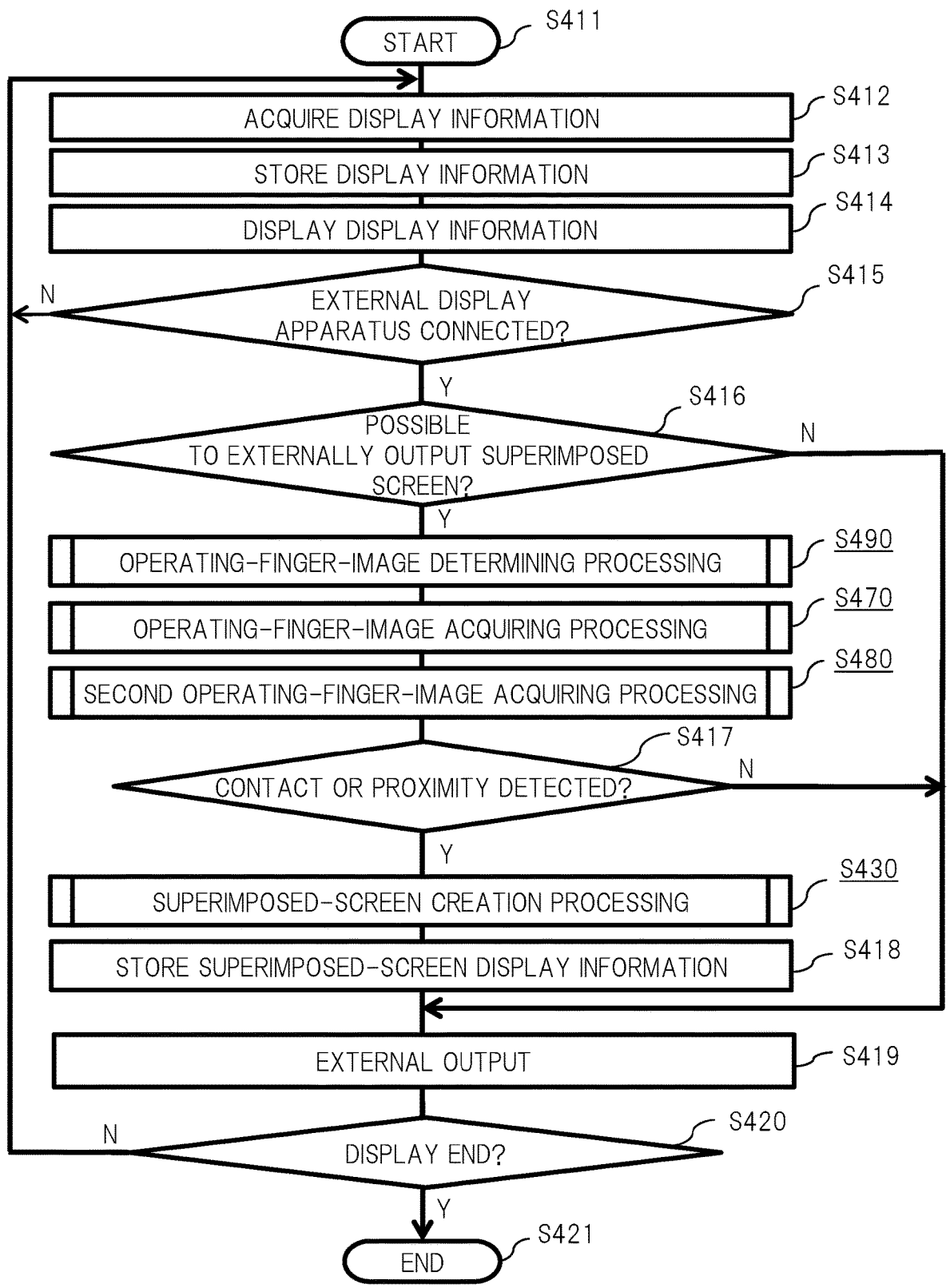
FIG. 14 illustrates a main processing flow in a fifth embodiment.

FIG. 14 illustrates the flow of the operating-finger superimposed-screen processing carried out by the smartphone 1 of the fifth embodiment. As a mainly different constituent point, the flow of FIG. 14 additionally includes step S490 after step S416 relative to the flow of FIG. 4. Step S490 is operating-finger determining processing carried out by the operating-finger determining function 316.

The operating-finger determining processing of step S490 specifically includes, for example, following processing (image capturing processing, analysis processing, etc.) First, as processing, operating-finger operating-finger capturing determining function 316 of the smartphone 1 captures an image of the hand/finger 10 above the display screen 3 (in the surface vertical direction) by using the camera 5 (the front camera 5A) of FIG. 1 to acquire the image. Note that, as a configuration example of the front camera 5A, the image capturing direction (in other words, optical axis) is the surface vertical direction of the display screen 3 in FIG. 1, and the image capturing range (in other words, view angle) covers, for example, the celestial hemisphere at +90 degrees from the optical axis and can capture the hand/finger 10 above the display screen 3. The configuration of the camera 5 is not limited to this, but is only required to be able to capture images of the hand/finger 10 above the display screen 3, that is, at least within a range of a certain distance in the surface vertical direction from the display screen 3.

Then, as operating-finger analysis processing, based on the above-described captured image, the operating-finger determining function 316 of the smartphone 1 determines the number, shape, thickness, longitudinal direction, proximity moving direction, etc., of the fingertip (s) 11 of the hand/finger 10, which is captured in the image, by using image analysis processing, etc. The proximity moving direction is the direction of the movement of the finger to be in proximity with the display screen 3. Also, based on such analysis results, the operating-finger determining function 316 determines which hand and finger the operating finger belongs to in this case. Such determination may be a rough estimation. As a result of the determination, for example, the operating finger is estimated as the index finger of the right hand.

After step S490, the processing continues to the above-described operating-finger-image acquiring processing of step S470. In the fifth embodiment, in step S470, the operating-finger-image acquiring function 313 of the smartphone 1 selects and acquires the finger image corresponding to the above-described determined operating finger (the first operating finger) from among the plurality of finger images stored in the data portion 42 of the storage 104. Then, the operating-finger-image acquiring function 313 stores the finger image of the operating finger by using the operating-finger-image storing function 305. The above-described processing example shows the case of single operating finger handled as the first operating finger. Even in the case in which there are two or more operating fingers as a result of the determination, similar processing can be carried out for each operating finger. When the second operating finger has been determined as a result of step S490, the finger image of the second operating finger is similarly acquired and stored in step S480. Then, above-described step S417 and following steps thereof are similarly carried out. As a result, on the superimposed screen, the finger image (s) of the above-described determined operating finger(s) is superimposed and displayed.

As described above, in the fifth embodiment, the operating finger(s) is automatically determined by utilizing the camera 5, the finger image (s) of the operating finger (s) is acquired/stored, and the superimposed screen is created. In the manner, the labor of the user to select/designate the operating finger (s) can be reduced.

Modification Example—Creation of Finger Image

In the fifth embodiment, etc., the finger image previously stored in the data portion 42 is displayed as the finger image 6 on the superimposed screen (the screen 4A). The finger image is not limited thereto, and following examples can be employed as modification examples. First, in a certain modification example, the smartphone 1 (for example, the video processor 107A of FIG. 2) may create the finger image 6, which is to be superimposed and displayed, by carrying out image processing to the finger image stored in the data portion 42. Examples of the image processing include enlarging/reducing the size, changing the direction of disposition, etc. The smartphone 1 creates the above-described finger image 6 so as not to display the data of the original finger image as the finger image 6 without change but to more suitably display it to be fitted with the state of the operating finger at the moment.

Also, in a certain modification example, the smartphone 1 may create the finger image 6 based on the images/videos captured by the above-described camera 5 and/or the detection information of the various sensors (the proximity sensor 73 and/or the sensor 105). For example, the smartphone 1 trims the hand/finger part in the image/video captured by the above-described camera 5. Then, the smartphone 1 creates the finger image 6, which is to be superimposed and displayed, by carrying out image processing to the trimmed hand/finger part. Examples of the image processing in this case include changing (for example, rotating, inverting, etc.) the captured hand/finger part so that the part is viewed from another direction (for example, the visual line direction of the user).

Figure 15:
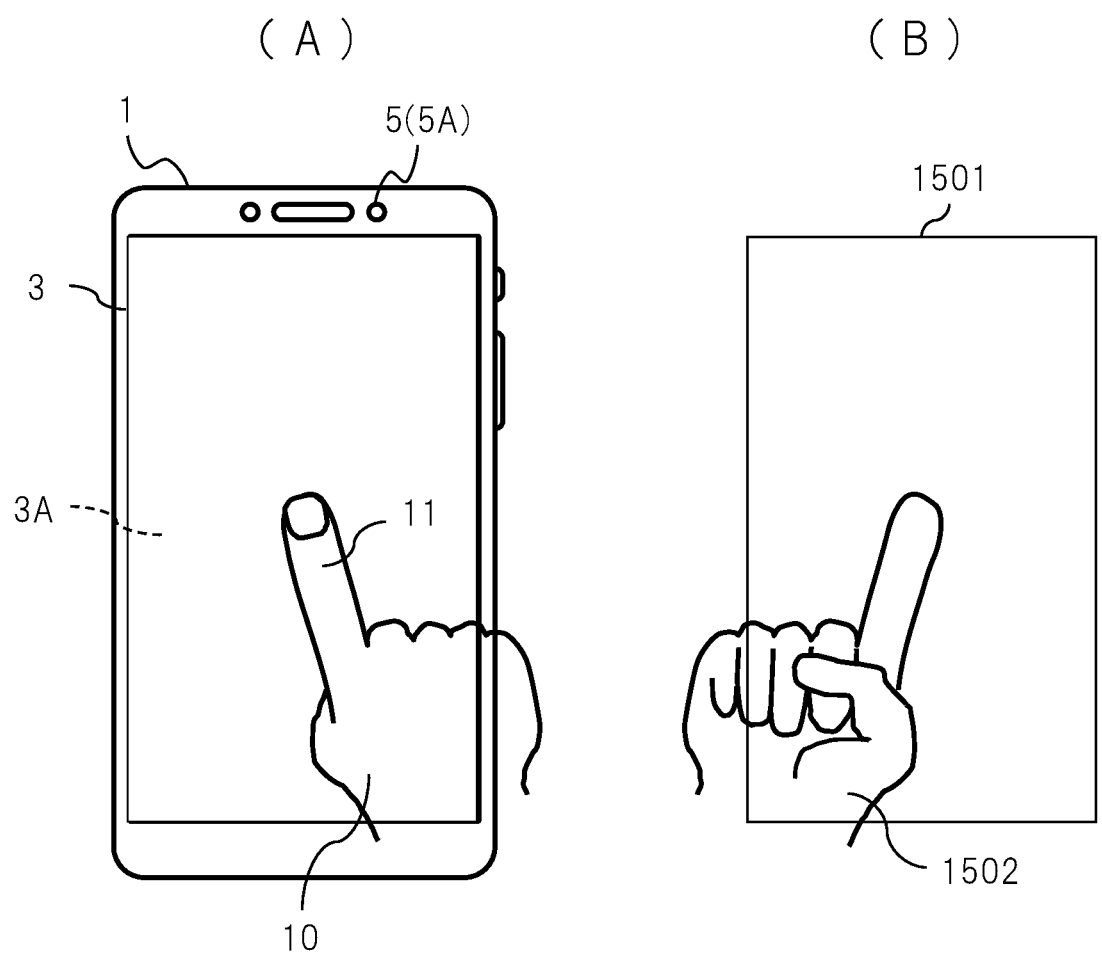
FIG. 15 illustrates examples of a state of a hand/finger and a camera image in a modification example of the fifth embodiment.

FIG. 15 is an explanatory diagram about the above-described modification example. FIG. 15 (A) illustrates a state viewed from the visual line direction of the user as an example of the state of the hand/finger 10 above the display screen 3 of the smartphone 1. The drawing illustrates a case in which the touch operation using the operating finger (the right index finger) is carried out in a vicinity of the center of the display screen 3. FIG. 15 (B) corresponds to FIG. 15 (A), and illustrates an example of the image-captured state of the hand/finger 10, which is viewed from the camera 5, in an image 1501 (herein, only the region of the display screen 3) of the camera 5 (the front camera 5A). Since the image capturing direction of the front camera 5A is the opposite of the visual line direction of the user, the hand/finger 10 of FIG. 15 (A) is in the state viewed from the opposite side in the image 1501 of FIG. 15 (B) as illustrated by a hand image part 1502. The smartphone 1 trims, for example, the hand image part 1502 while using the image 1501 illustrated in FIG. 15 (B), and uses the image to create the finger image 6. The smartphone 1 can also determine that the operating finger is, for example, the right index finger from, for example, the image 1501 illustrated in FIG. 15 (B).

Also, in a certain modification example, based on the image/video captured by the above-described camera 5 and/or the detection information of the various sensors, the smartphone 1 may newly create the finger image 6 which is different from the data of the original finger image in the data portion 42. The smartphone may create the finger image 6 without referring to the finger image data in the data portion 42 at all. An advantageous point of this case is that, for example, even when the image of the camera 5 is distorted or when the acquired data of the various sensors is varied, the influences of such cases can be suppressed by the new creation, and the finger image 6 can be superimposed and displayed with a good viewing quality.

The sensor for determining the operating finger is not limited to the camera 5 (the front camera 5A), and any technique can be employed. As an example of a different sensor, in order to improve the accuracy of analysis, the state of the hand/finger in three-dimensional space including the distance of the display screen 3 in the surface vertical direction may be detected by using, for example, a stereo camera using two front cameras. Also, as another example of the sensor, a three-dimensional distance sensor such as the above-described LiDAR may be used. The shape, the proximity moving direction, etc., of the operating finger with respect to the display screen 3 may be more accurately detected by such a sensor. Also, such a sensor can also function as the above-described proximity sensor 73. In other words, a stereo camera, LiDAR, etc., may be employed as the proximity sensor 73 and the sensor for determining the operating finger, etc. The disposed position of such a sensor (the camera 5, the proximity sensor 73, etc.) is not limited to the position of the front camera 5A of FIG. 1, and any position can be employed depending on sensor specifics, and may be, for example, in a back surface region of the display screen 3, a frame region of the body, etc.

As described above, in the fifth embodiment and the modification examples, the more realistic finger image 6 with reflection of the actual operating finger shape, the state of the proximity moving direction, etc., can be created, superimposed, and displayed. Therefore, the user can suitably carry out operation.

Sixth Embodiment

The sixth embodiment will be described with reference to FIG. 16 and following drawings. In each of the above-described embodiments, the smartphone 1 does not use the actual visual line direction of the user for control. In the sixth embodiment, the smartphone 1 uses the actual visual line direction of the user for control.

[Visual Line Detection]

A configuration example of hardware, etc., of the smartphone 1 in the sixth embodiment will be described with reference to the above-described FIG. 2. The smartphone 1 of the sixth embodiment further includes the visual-line detector 110 of FIG. 2. The visual-line detector 110 may be mounted as part of the video portion 107. The visual-line detector 110 may be mounted as an independent device including a camera or a sensor and a circuit, or may be mounted as part of the video portion 107 by software program processing or a dedicated circuit using the images of the camera 5 or the detection information of the sensor.

The visual-line detector 110 is a block which detects the visual line direction (the visual line direction a1 of FIG. 8) of the user who is operating the smartphone 1. In the sixth embodiment, by using the front camera 5A of FIG. 1, the smartphone 1 captures an image of a region including the face of the user within the range of a predetermined view angle, an optical axis of which is the surface vertical direction of the display screen 3, and acquires a face image. Then, the visual-line detector 110 analyzes the direction of the face, the positions of both eyes, the state of the pupils, etc., from the face image, and detects the visual line direction.

Note that, for example, the followings can be employed to the visual-line detector 110 as a publicly known visual-line detection method. As the visual line detection, a so-called eye tracking technique can be used. The eye tracking technique includes a method of capturing images of the inner eye corner and the iris by using a visible light camera to detect the visual line, a method of detecting the visual line by using a corneal reflection method using an infrared LED and an infrared camera, etc. For example, in the corneal reflection method, infrared rays are emitted from the infrared LED to the face, its image is captured by the infrared camera, and the visual line direction is detected based on the position of the pupil relative to a corneal reflection position while using the position of the reflected light on the cornea a reference point. Meanwhile, in the method of using the visible light camera, an image of an eye is captured by the visible light camera, and the visual line direction is detected based on the position of the iris relative to the inner eye corner while using the inner eye corner as a reference point and the iris as a moving point. Meanwhile, in the method of detecting the visual line direction of each of both eyes, a gaze point can be detected from the intersecting point of the visual line directions of both eyes.

As a mounting example of the visual-line detector 110, a camera or a sensor may be configured to be disposed in the touch panel 7. The visual-line detector 110 of the smartphone 1 can calculate the visual line direction from the detection information of the camera or the sensor. Also, as a mounting example of the visual-line detector 110, a three-dimensional distance sensor such as the above-described LiDAR may be employed. The visual-line detector 110 of the smartphone 1 can calculate the visual line direction from the detection information of the LiDAR.

In the sixth embodiment, as part of the functions, setting for whether to reflect the visual line direction of the user to processing or not can be previously set by, for example, the initial settings or the user settings. The following explanations will be given on the assumption with the setting of reflecting the visual line direction of the user to the processing (the setting of turning on the function about the visual line detection).

[Processing Flow]

Figure 16:
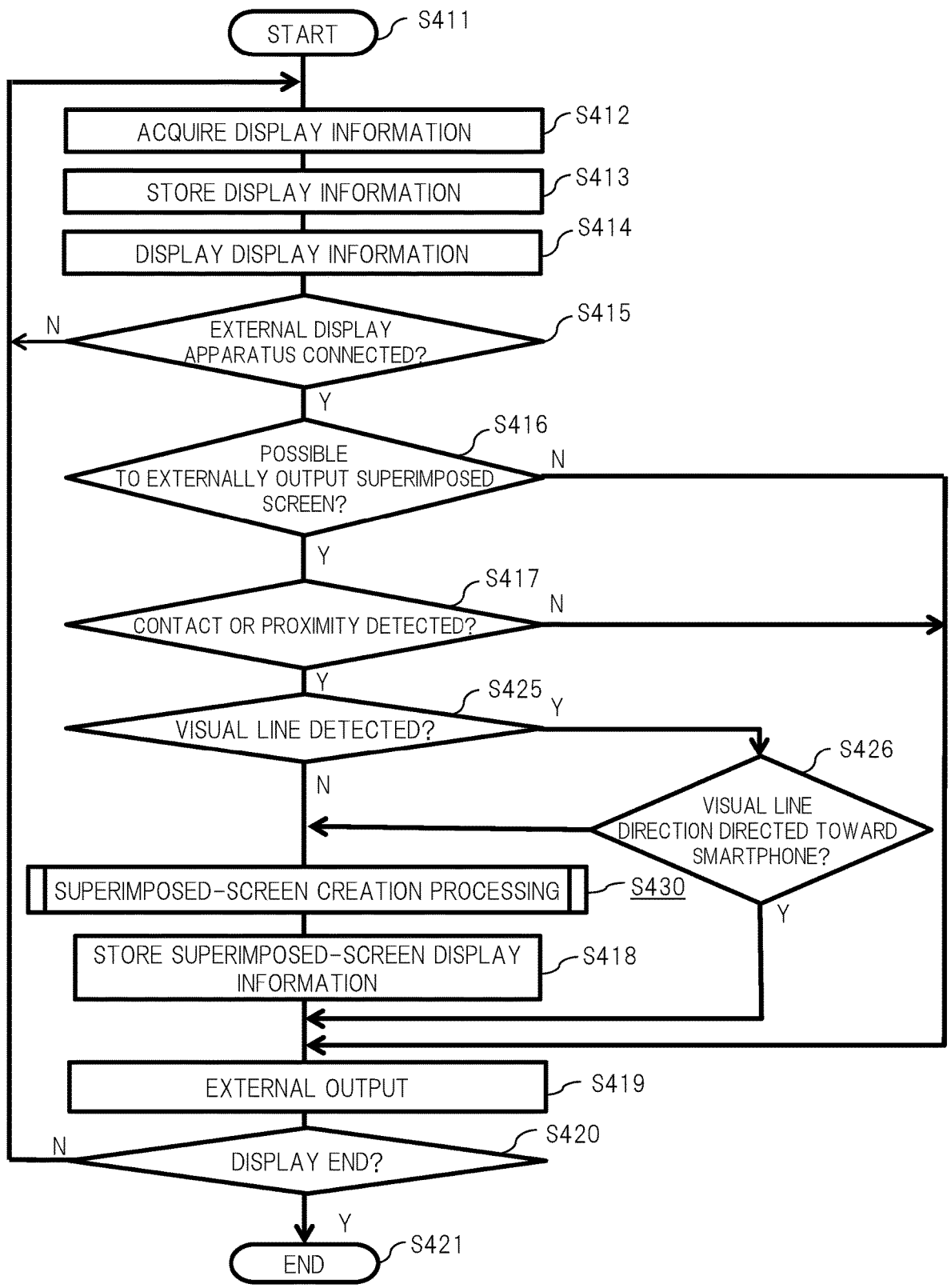
FIG. 16 illustrates a main processing flow in a sixth embodiment.

FIG. 16 illustrates the flow of operating-finger superimposed-screen processing of the sixth embodiment. The flow of FIG. 16 additionally includes step S425 and step S426 after step S417 relative to the configuration of the first embodiment of FIG. 4 as mainly different constituent points. In FIG. 16, the above-described operating-finger-image acquiring processing of step S470 and the second operating-finger-image acquiring processing of step S480 are omitted, but can be similarly carried out. If the proximity or the contact has been detected (Y) in step S417, the processing proceeds to step S425.

In step S425, the smartphone 1 determines whether the visual line direction of the user has been detected by the visual-line detector 110. In step S425, if the visual line direction has been not detected (N), the processing proceeds to step S430. If the visual line direction has been detected (Y), the processing proceeds to step S426. When the processing proceeds to step S430, the processing is similar to that of the above-described embodiment. Note that, even in setting of not reflecting the visual line direction to the processing set by the user, the processing similarly transitions to step S430.

In step S426, the smartphone 1 determines whether the visual line direction is directed toward the display screen 3 (the corresponding screen 3A) of the smartphone 1. As processing example, it is determined that the visual line direction has been directed toward the display screen 3 when the visual line direction is within a predetermined direction range.

When it is determined in step S426 that the visual line direction has not been directed toward the display screen 3 of the smartphone 1 (N), the processing transitions to step S430. This case (S426—N) means that the superimposed screen is externally output to the television 2 which is the external display apparatus by the flow of steps S430 and S419. A reason why the superimposed screen (the screen 4A) with the finger image 6 is displayed on the television 2 in this case (S426—N) will be described below. In this case (S426—N), it is expected that the user is not looking at the display screen 3 of the smartphone 1 but looking at something else. In other words, in this case (S426—N), it is expected that there is possibility that the user is looking at and operating the display screen 4 of the television 2 which is the external display apparatus, with the visual line direction a2 as illustrated in FIG. 8. Therefore, by the flow of steps S430 and S419, the superimposed screen (the display information 9A) including the finger image 6 is externally output to the television 2 and is displayed as the screen 4A on the display screen 4. This manner can appropriately support the case in which the user carries out operation while looking at the screen 4A.

On the other hand, if it is determined in step S426 that the visual line direction is directed toward the display screen 3 (the screen 3A) of the smartphone 1 (Y), the processing transitions to step S419. This case (S426—Y) means that the superimposed screen superimposed with the finger image 6 is not output to the television 2 which is the external display apparatus, in other words, the superimposed screen not superimposed with the finger image 6 is output. In the flow of this case (S426—Y), step S430 is excluded, and therefore, the finger image 6 is not superimposed on the contents of the original screen 3A, and the display information 9A corresponding to this screen 3A is externally output in step S419. A reason why the superimposed screen (the screen 4A) with the finger image 6 is not displayed on the television 2 in this case (S426—Y) will be described below. In this case (S426—Y), it is expected that there is no possibility that the user is looking at and operating the television 2 since the user is looking at the display screen 3 of the smartphone 1. Therefore, the superimposed screen (the display information 9A) not including the finger image 6 is externally output to the television 2 and is displayed as the screen 4A on the display screen 4 by the flow from which step S430 is excluded. In the manner, the processing (step S430) of superimposing the finger image 6 can be eliminated to improve efficiency.

Meanwhile, in the above-described case (S426—N) in which the visual line direction has not been directed toward the smartphone 1, the following control may be further employed. For example, a following step is added before step S430. For power saving, the smartphone 1 temporarily stops the display on the display 72 of the touch panel 7 or turns off the backlight. Note that step S430, etc., are similarly carried out. After this step, and if it is detected at the steps S425 and S426 under the repeat of this flow that the visual line direction has been directed toward the smartphone 1 (S426—Y), the smartphone 1 resumes the display on the display 72 or turns on the backlight in order to cancel the power saving state, for example, before step S419.

FIG. 17 is an explanatory diagram about the sixth embodiment. FIG. 17 (A) illustrates a control example of the above-described case (step S426—Y) in which the visual line is directed toward the smartphone 1, and FIG. 17 (B) illustrates a control example of the above-described case (step S426—N) in which the visual line is not directed toward the smartphone 1. In FIG. 17 (A), the visual line direction a1 is directed toward the display screen 3. On the screen 4A of the television 2, the finger image 6 is not superimposed and displayed. In FIG. 17 (B), a visual line direction a3 is an unknown visual line direction, and is possibly directed toward the screen 4A of the television 2. On the screen 4A of the television 2, the finger image 6 is superimposed and displayed.

As described above, according to the sixth embodiment, depending on the visual line direction of the user, specifically, depending on whether the visual line is directed toward the display screen 3 of the smartphone 1, the processing about the superimposed screen can be optimized, and power saving can be also achieved.

The following can be also employed as a modification example of the sixth embodiment. In the case of FIG. 17 (A) in which the visual line is directed toward the smartphone 1, the external output of the superimposed screen (the display information 9A) per se may be temporarily stopped. In such a case, the display on the screen 4A of the television 2 may be, for example, a black display, a message display of "OFF", or the like. The display information 9A externally output in this case may be black display information, message information of "OFF", or the like.

Modification Example

In the above-described embodiments, the entire display screen 3 of the smartphone 1 is set as the range of creation of the superimposed screen. The range is not limited thereto, and only part of the display screen 3 may be set as the range of creation of the superimposed screen. By the user settings, the range of creation of the superimposed screen may be set. For example, when there are displays on a plurality of parts such as multiwindow or the like of the OS, applications, or GUI of the smartphone 1, only the part of a particular window or the part of a display region designated by the application can be also set as the range of creation of the superimposed screen.

FIG. 18 illustrates a setting example of the range of creation of the superimposed screen of the above-described modification example. Regarding the configuration of the contents, GUI, etc., of the screen 3A based on a certain application, the function of the display screen 3 of the smartphone 1 in the modification example is divided into, for example, an upper screen region 3d1 and a lower screen region 3d2 by the user settings. Then, for example, only the lower screen region 3d2 is set as a target region of the above-described function, in other e of creation of the superimposed screen. The upper screen region 3d1 (for example, the region in which moving images serving as contents are displayed) is set as the region without the superimposing of the finger image 6, and the lower screen region 3d2 is set as the region with the superimposing of the finger image 6. In the case of this setting, on the display screen 4 of the television 2, regarding the display on the screen 4A corresponding to the screen 3A, the finger image 6 is superimposed and displayed only in a region 4d2 corresponding to the lower screen region 3d2. Therefore, for example, the user can suitably visually recognize the contents of the original screen region 3d1 in an upper region 4d1, and can suitably operate the GUI objects in the lower region 4d2. Even when the operating finger is overlapped with the screen region 3d1, the finger image 6 is not displayed in the corresponding region 4d1.

In the foregoing, the invention made by the inventors of the present application has been concretely described on the basis of the embodiments. However, the present invention is not limited to the foregoing embodiments, and various modifications and alterations can be made within the scope of the present invention. Except for essential constituent elements, each constituent element of the embodiments can be added/deleted/replaced and so on. Modes combinations of the embodiments can be also employed. The main effects of the embodiments can be obtained also in those modes. Unless otherwise specifically stated, each constituent element may be single constituent element or plural constituent elements. Mounting of each function and constituent element of the embodiments may be achieved by hardware such as an integrated circuit, may be achieved by software program processing using a processor, or may be combinations thereof.

In the above-described embodiments, the case in which the smartphone serving as the mobile information terminal has been described. However, the embodiments can be also similarly applied to a tablet terminal, personal computer equipment including a laptop computer, etc. Also, as described above, the size of the display screen of the mobile information terminal can be equal to or larger than the size of the display screen of the external display apparatus. Such a case cannot provide the effect of viewing with a large screen of an external display apparatus, but can similarly achieve the basic effect of, for example, allowing the operating finger to be visually recognized on the mirroring screen.

In the above-described embodiments, the case of the television serving as the external display apparatus has been described. However, other optional external display apparatus can be also applied. As examples of other external display apparatuses, video projectors, computer monitors, and Head Mounted Displays (HMDs), etc., are exemplified.

Particularly, when the present invention is applied to a see-through HMD, the following effects can be also achieved. The user also uses the smartphone 1 in the state while being wearing the see-through HMD on his/her head. The superimposed screen (the display information 9A) with the finger image 6 is externally output from the smartphone 1 to the see-through HMD, and is displayed on a display screen of the see-through HMD. In such a case, the display screen of the see-through HMD and the display screen 3 of the smartphone 1 are occasionally overlapped with each other when viewed from the user. The visual line direction of the user is, for example, directed toward the display screen of the see-through HMD or toward the display screen 3 of the smartphone 1 beyond it. In such a case, conventionally, it is occasionally difficult for the user to visually recognize the screen 3A of the smartphone 1 due to the overlapping. When the functions of the above-described embodiments are applied to the smartphone 1 in such a case, the user can achieve operation of the smartphone 1 while visually recognizing the mirroring screen of the display screen of the see-through HMD without the necessity of directly viewing the screen 3A of the smartphone 1.

REFERENCE SIGNS LIST

1 SMARTPHONE (INFORMATION DISPLAY APPARATUS, MOBILE INFORMATION TERMINAL)
2 TELEVISION (EXTERNAL DISPLAY APPARATUS)
3 DISPLAY SCREEN
4 DISPLAY SCREEN
3A SCREEN
4A SCREEN
5 CAMERA
6 FINGER IMAGE (OPERATING-OBJECT IMAGE)
9 COMMUNICATION
9A DISPLAY INFORMATION
9B DISPLAY INFORMATION
10 HAND/FINGER
11 FINGERTIP (OPERATING FINGER).

The invention claimed is:

1. An information display apparatus comprising
a touch panel having a touch sensor configured to detect contact of an operating object carried out by a user with respect to a first display screen,
wherein second display information having a content including an operating-object image representing the operating object superimposed on first display information displayed on the first display screen of the touch panel is created based on the detection by the touch sensor,
the second display information is externally output to an external display apparatus, and is displayed on a second display screen of the external display apparatus; and
a proximity sensor configured to detect proximity of the operating object with respect to the first display screen,
wherein the second display information having the content including the operating-object image representing the operating object superimposed on the first display information displayed on the first display screen of the touch panel is created based on the detection by the touch sensor and the proximity sensor.

2. The information display apparatus according to claim 1,
wherein, when a proximity state of the operating object with respect to the first display screen is detected based on the proximity sensor, a first operating-object image representing the proximity state of the operating object is created as the operating-object image, and is superimposed on the first display information, and,
when a contact state of the operating object with respect to the first display screen is detected based on the touch sensor, a second operating-object image representing the contact state of the operating object is created as the operating-object image, and is superimposed on the first display information.

3. The information display apparatus according to claim 2,
wherein the first operating-object image and the second operating-object image are different from each other in display, and
the difference in display is expressed by at least one of a color, density, contrast, transparency, contour line type, and size.

4. The information display apparatus according to claim 1,
wherein operating-object images of a plurality of types corresponding to operating objects of a plurality of types are previously stored as the operating-object image, and
the operating-object image selected from the operating-object images of the plurality of types is used for the superimposition.

5. The information display apparatus according to claim 4,
wherein the operating-object image is selected in response to designation by the user.

6. The information display apparatus according to claim 1 further comprising
a camera or a sensor,
wherein a shape of the operating object with respect to the first display screen is detected by using the camera or the sensor,
a type of the operating object is determined based on the shape of the operating object, and
the operating-object image is created in accordance with the determined type.

7. The information display apparatus according to claim 1 further comprising
a camera or a sensor,
wherein a shape of the operating object with respect to the first display screen is detected by using the camera or the sensor, and
the operating-object image is created based on the shape of the operating object.

8. The information display apparatus according to claim 7,
wherein an image including the shape of the operating object with respect to the first display screen is acquired by using the camera or the sensor,
a part representing the shape of the operating object in the image is trimmed, and
image processing is carried out to the trimmed part to create the operating-object image.

9. The information display apparatus according to claim 1,
wherein a distance of the operating object to the first display screen is detected based on the proximity sensor,
a threshold value about the distance is previously set,
when the distance is equal to or shorter than the threshold value, it is determined there is pseudo contact, and,
in a case of the pseudo contact, the operating-object image representing a contact state of the operating object is superimposed.

10. The information display apparatus according to claim 1,
wherein a visual line direction of the user is detected, and,
when the visual line direction is directed toward the information display apparatus, the operating-object image is not superimposed.

11. The information display apparatus according to claim 1,
wherein a visual line direction of the user is detected, and, when the visual line direction is not directed toward the information display apparatus, the display on the first display screen is stopped.

12. The information display apparatus according to claim 1, wherein, when two or more operating objects are in contact with the first display screen of the touch panel at the same time based on the detection by the touch sensor, the second display information having the content including the operating-object image representing the two or more operating objects superimposed on the first display information is created.

13. The information display apparatus according to claim 1, wherein, when two or more operating objects are in contact or proximity with the first display screen of the touch panel at the same time based on the detection by the touch sensor and the proximity sensor, the second display information having the content including the operating-object image representing the two or more operating objects superimposed on the first display information is created.

14. The information display apparatus according to claim 1, wherein a designated region of regions of the first display screen is set as a region allowing the operating-object image to be superimposed.

15. An information display method of an information display apparatus, wherein the information display apparatus includes:
a touch panel having a touch sensor configured to detect contact of an operating object carried out by a user with respect to a first display screen, and
a proximity sensor configured to detect proximity of the operating object with respect to the first display screen,
the operating object is a hand/finger of the user or an object held by the hand/finger,
the information display method comprising, as steps executed by the information display apparatus:
a step of, based on the detection by the touch sensor, creating second display information having a content including an operating-object image representing the operating object superimposed on first display information displayed on the first display screen of the touch panel; and
a step of externally outputting the second display information to an external display apparatus and displaying the second display information onto a second display screen of the external display apparatus,
wherein the second display information having the content including the operating-object image representing the operating object superimposed on the first display information displayed on the first display screen of the touch panel is created based on the detection by the touch sensor and the proximity sensor.

* * * * *